US012639508B2

(12) United States Patent
Gupta et al.

(10) Patent No.: US 12,639,508 B2
(45) Date of Patent: May 26, 2026

(54) MODIFYING A DIGITAL DESIGN DOCUMENT VIA CUSTOMIZED ACCESS RIGHTS TO DOCUMENT PORTIONS

(71) Applicant: Adobe Inc., San Jose, CA (US)

(72) Inventors: Shailja Gupta, Ghaziabad (IN); Sanyam Jain, New Delhi (IN); Saagar Gavri, Gurgaon (IN); Rohit Bansal, Noida (IN); Rishav Agarwal, Banglore (IN); Radha Gupta, Greater Noida (IN); Prateek Gaurav, Lucknow (IN); Ashutosh Sharma, Noida (IN); Ashish Jain, Greater Noida (IN); Arvin Mittal, Bathinda (IN); Anurag Singh, Noida (IN); Ankit Kumar, Noida (IN); Anasuiya Gupta, Pitampura (IN); Abhishek Majumder, Kolkata (IN); Abhinav Kumar Agarwal, Lucknow (IN)

(73) Assignee: Adobe Inc., San Jose, CA (US)

( * ) Notice: Subject to any disclaimer, the term of this patent is extended or adjusted under 35 U.S.C. 154(b) by 209 days.

(21) Appl. No.: 18/539,888

(22) Filed: Dec. 14, 2023

(65) Prior Publication Data

US 2025/0200269 A1    Jun. 19, 2025

(51) Int. Cl.
*G06F 40/166* (2020.01)
*G06F 21/62* (2013.01)

(52) U.S. Cl.
CPC .......... *G06F 40/166* (2020.01); *G06F 21/629* (2013.01)

(58) Field of Classification Search
CPC ..................................................... G06F 40/166
See application file for complete search history.

(56) References Cited

U.S. PATENT DOCUMENTS

| | | | |
|---|---|---|---|
| 2005/0223008 A1* | 10/2005 | Kubota et al. .......... | G06F 17/30 |
| 2010/0251142 A1* | 9/2010 | Geppert et al. ......... | G06F 3/048 |
| 2016/0110036 A1* | 4/2016 | Baumgartner et al. ..................... G06F 3/0482 | |
| 2017/0083871 A1* | 3/2017 | Chang et al. ...... | G06Q 10/1095 |
| 2018/0300304 A1* | 10/2018 | Mullins et al. ....... | G06F 17/248 |
| 2021/0216704 A1* | 7/2021 | Peterson et al. ...... | G06F 40/197 |
| 2023/0353651 A1* | 11/2023 | Maurer et al. .......... | H04L 67/54 |

* cited by examiner

*Primary Examiner* — James J Debrow
(74) *Attorney, Agent, or Firm* — Keller Preece PLLC

(57) ABSTRACT

The present disclosure relates to systems, methods, and non-transitory computer-readable media that provides customized editing access rights for sub-portions of a digital design document. In particular, the disclosed systems generate a mapping between a selected sub-portion of a plurality of sub-portions of a digital design document and a user account indicating editing access rights to the selected sub-portion for the user account. Furthermore, the disclosed systems receives digital content from a client device associated with the user account for the selected sub-portion. Moreover, the disclosed systems modify the selected sub-portion to include the digital content from the client device based on the mapping between the selected sub-portion and the user account.

20 Claims, 11 Drawing Sheets

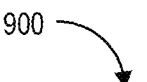

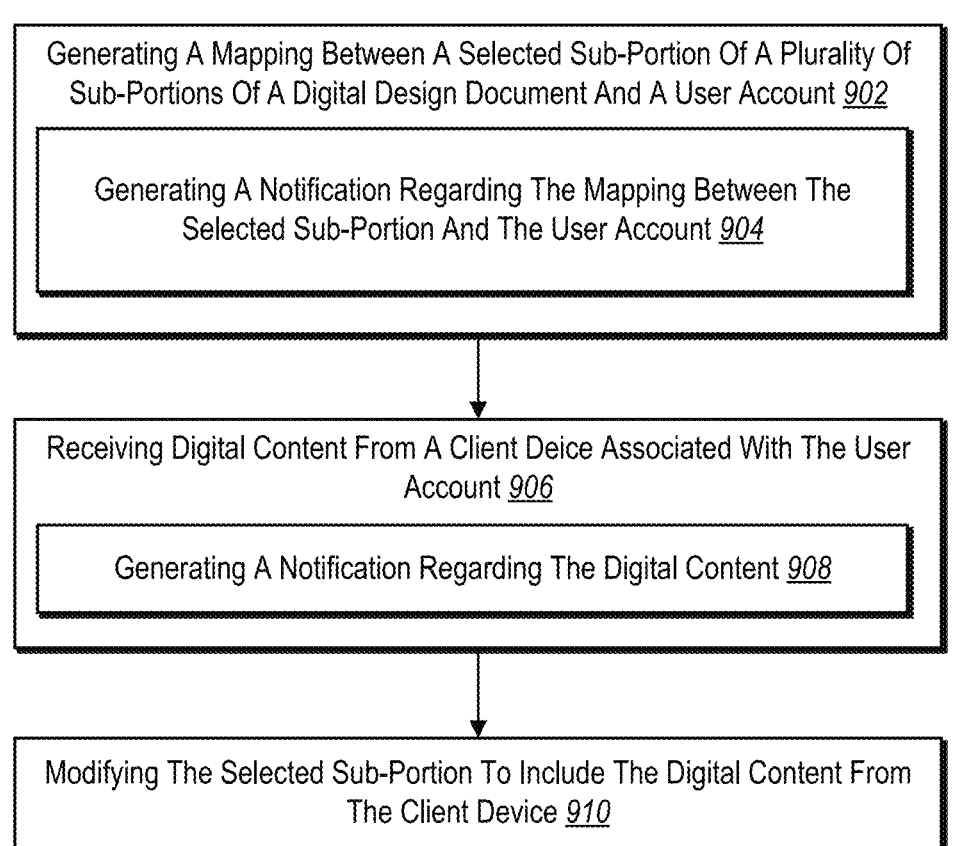

Generating A Mapping Between A Selected Sub-Portion Of A Plurality Of Sub-Portions Of A Digital Design Document And A User Account *902*

Generating A Notification Regarding The Mapping Between The Selected Sub-Portion And The User Account *904*

Receiving Digital Content From A Client Deice Associated With The User Account *906*

Generating A Notification Regarding The Digital Content *908*

Modifying The Selected Sub-Portion To Include The Digital Content From The Client Device *910*

*Fig. 9*

MODIFYING A DIGITAL DESIGN DOCUMENT VIA CUSTOMIZED ACCESS RIGHTS TO DOCUMENT PORTIONS

BACKGROUND

Recent years have seen significant advancements in hardware and software platforms for creating and modifying digital design documents. For example, modifying a digital design document often involves collaboration between multiple different users with different client devices and/or software applications. For instance, a single digital design document can include different portions including text and/or images created by a number of different users (e.g., different copy editors for different types of digital content). Because collaborative editing of digital design documents often involves many different users and/or client devices or software applications, such a process is a complex and time-consuming task. Conventional platforms that provide tools for collaborative editing of digital design documents suffer from a variety of issues in relation to efficiency, accuracy, and operational flexibility.

SUMMARY

One or more embodiments described herein provide benefits and/or solve one or more of the problems in the art with systems, methods, and non-transitory computer-readable media that provides digital design document modification via customized editing access rights of different document portions to different user accounts. For example, for creation and modification of a digital design document, the disclosed systems streamline collaboration between user accounts associated with different client devices based on a mapping indicating editing access rights for the user accounts to specific sub-portions of the digital design document. For instance, the disclosed systems provide asynchronous editing of the digital design document by controlling editing access rights (based on the mapping) to specific sub-portions of the digital design document for multiple user accounts. Further, in some embodiments, the disclosed systems receive digital content from a client device associated with a user account (e.g., with editing access rights for a selected sub-portion) and the disclosed systems modify the selected sub-portion to include the digital content according to the editing access rights. The disclosed systems thus provide flexible and customizable collaborative document editing with granular access right assignment to different document portions.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 9 illustrates a flowchart of a series of acts for modifying a digital design document via customized editing access rights to a selected sub-portion in accordance with one or more implementations;

DETAILED DESCRIPTION

Figure 1:
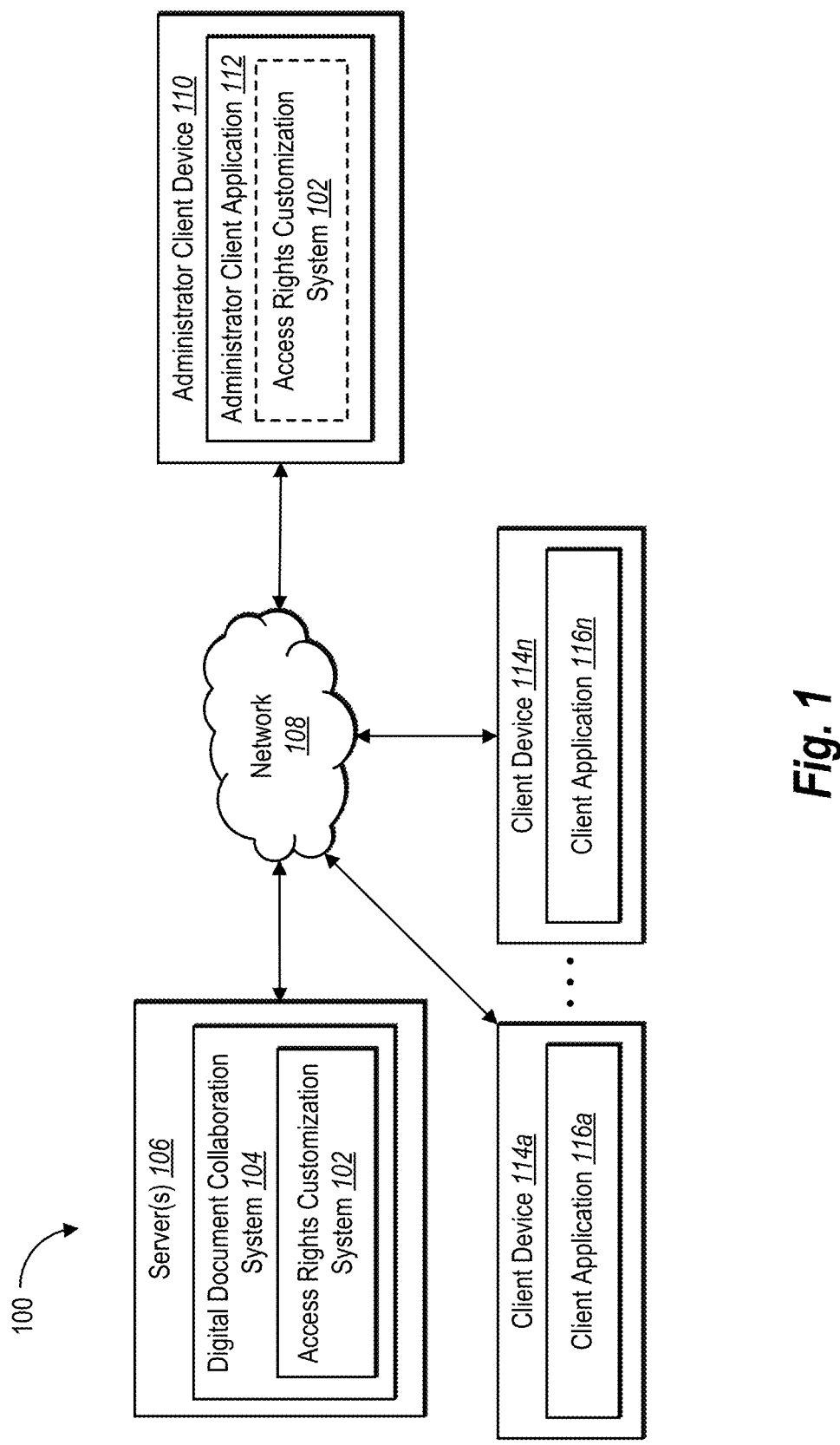
FIG. 1 illustrates an example environment in which an access rights customization system operates in accordance with one or more implementations.

One or more embodiments described herein include an access rights customization system that provides collaborative document editing by utilizing editing access rights management for separate portions of a digital design document. In particular, the access rights customization system provides tools for modifying the separate portions of the digital design document by assigning editing access rights to the separate portions to one or more user accounts responsible for generating/editing digital content in the respective portions. For example, in some embodiments the access rights customization system provides (e.g., to a client device associated with a user account) control to modify/edit digital content in a particular part of the digital design document. Additionally, the access rights customization system modifies the digital design document in response to receiving digital content from the client device associated with the user account according to the editing access rights for the selected sub-portion. Accordingly, the access rights customization system leverages assignment of editing access rights of separate portions of the digital design document to a plurality of user accounts to provide granular and efficient editing of digital content in a collaborative document editing process.

In one or more embodiments, the access rights customization system generates or modifies a digital design document containing multiple portions (e.g., stories with text and/or images) via customizable editing access rights of the portions of the digital design document. For instance, the access rights customization system generates mappings indicating editing access rights for one or more user accounts to selected sub-portions of the digital design document in response to input from an administrator client device. To illustrate, the access rights customization system generates a mapping between a sub-portion of the digital design document and a specific user account in response to a selection of the sub-portion and an assignment indicating the specific user account. For instance, in a digital design application, the access rights customization system provides a content editing panel to indicate the various assignments of sub-portions and generate mappings of sub-portions of the digital design document to one or more user accounts.

Furthermore, in response to generating mappings between one or more sub-portions of the digital design document and one or more user accounts, the access rights customization system sends one or more notifications to the one or more user accounts. For example, the access rights customization system sends the notification(s) to the user account(s) (e.g., to one or more client devices associated with the user account(s)) notifying the user account(s) of the assignments to the one or more sub-portions of the digital design document. In connection with sending a notification to a user account, the access rights customization system causes a client device associated with the user account to display the digital design document with the user account's assigned sub-portion (e.g., story) indicated in the graphical user interface. In some instances, the client device associated with the user account submits digital content (e.g., new content or content modifications) for the assigned sub-portion to the access rights customization system.

Further, in some embodiments, the access rights customization system receives the digital content from the client device and notifies the administrator client device. In some embodiments, the access rights customization system causes a graphical user interface of the administrator client device to display indications regarding digital content submitted by one or more client devices associated with one or more user accounts. In some such instances, the access rights customization system determines whether to accept or reject the digital content submitted by the client device(s) in response to interactions with the administrator client device. Moreover, in some embodiments, the access rights customization system revokes or modifies a mapping for a sub-portion of the digital design document in response to input via the administrator client device. As such, in some embodiments, the access rights customization system effectively and accurately streamlines collaboration among multiple client devices working on a single digital design document.

As mentioned above, many conventional systems suffer from a number of issues in relation to computational inefficiency, inaccuracy, and operational flexibility. For example, existing systems suffer from excessive user interactions. For instance, some existing systems provide document collaboration by inefficiently duplicating a digital design document and distributing separate copies of the digital design document to a plurality of client devices of users for separately modifying the digital design document. Further, some existing systems also typically require a user managing the digital design document to separately communicate with each user regarding assigned tasks for modifying the digital design document. Accordingly, such existing systems receive content back from user client devices for each separately transmitted copy of the digital design document, requiring the managing user to compile the digital content separately received from the different copies of the digital design document (e.g., into a master copy).

Furthermore, in some instances, existing systems further suffer from computational impracticalities and inefficiencies due to the presence of many files and a large number of collaborators (e.g., copy editors or other users) in a collaborative document editing process. Specifically, in some existing systems, designers are required to transmit many copies of digital design documents to many different user accounts and compile separately received content from the user accounts. Accordingly, existing systems suffer from computational inefficiencies such as excessive interactions, wasted time, and wasted resources in attempting to collaborate between many user accounts, which results in a serial and error-prone process.

Relatedly, existing systems suffer from computational inaccuracy. As just mentioned, due to the duplication and transmittal of multiple copies of a single digital design document, conventional systems often suffer from inaccurately compiling the received digital content. Often, a designer of existing systems fails to correctly collate all the modifications, changes, and edits received from multiple user accounts. Furthermore, existing systems generally user file-based access rights, which results in designers working on a duplicated version of a digital design document sometimes modifying/editing an incorrect portion of the digital design document. As such, digital design documents involved with collaboration in existing systems are often riddled with errors and formatting issues (e.g., due to the loss of local formatting changes when the digital design document is transmitted back to a designer client device).

Existing digital illustration systems also often suffer from operational inflexibility. Indeed, as noted above in relation to the inefficiency and inaccuracy of some conventional systems, many conventional systems are also rigidly limited to a smaller number of collaborators. Specifically, because the existing systems utilize file-based access rights, the existing systems limit the number of collaborators with access to a particular digital design document to prevent certain errors and inefficiencies. Accordingly, the existing systems also experience an inability to customize editing controls for a specific user account collaborating on editing a digital design document. Thus, many of the inefficiency and inaccuracy concerns discussed above exacerbate the operational flexibility of existing systems.

One or more embodiments of the access rights customization system provide several advantages over conventional systems. For example, in one or more embodiments, the access rights customization system improves efficiency over prior systems. For example, as mentioned, conventional systems suffer from excessive interactions of duplicating a single digital design document, separately transmitting each duplication and receiving/compiling a plurality of edits. In contrast, the access rights customization system leverages granular access rights management for separate sub-portions of a digital design document in a collaborative document editing process. In particular, the access rights customization system generates a mapping between a selected sub-portion of a plurality of sub-portions of a digital design document and a user account, which indicates editing access rights to the selected sub-portion for the user account. The access rights customization system thus provides customizable editing of individual sub-portions without generating and modifying duplicates of the digital design document.

In some embodiments, the access rights customization system provides a streamlined collaborative editing process involving a plurality of user accounts. Specifically, the access rights customization system transmits notifications to user accounts based on generated mappings indicating editing access rights for the user accounts. The access rights system also receives digital content from the user accounts for the corresponding sub-portions for editing a digital design document as indicated by the mappings. In doing so, the access rights customization system eliminates excessive interactions involved with duplicating, transmitting, receiving, and compiling edits. For instance, the access rights customization system receives digital content from a client device associated with a user account for a selected sub-portion and modifies the selected sub-portion to include the digital content based on the corresponding mapping.

Furthermore, the access rights customization system provides improved computational efficiency over conventional systems. As mentioned, conventional systems suffer from inefficiencies of computational impracticalities resulting from modifying a digital design document by generating and sending a plurality of copies to a plurality of client devices. In contrast, the access rights customization system generates a plurality of mappings between different sub-portions of a digital design document and a plurality of user accounts. In some such instances, the access rights customization system also provides timely collaborative editing by transmitting notifications to the user accounts associated with the plurality of mappings. Moreover, in such instances, the access rights customization system modifies one or more sub-portions to include digital content received from the user accounts. In doing so, the access rights customization system eliminates the wasted resources associated with duplicating and transmitting copies of a digital design document and compiling digital content from separate copies of a digital design document by assigning editing access rights of separate sub-portions of the digital design document to one or more user accounts. Similarly, the access rights customization system also improves computational accuracy of computing systems involved in a collaborative editing process via editing access rights for separate sub-portions of a digital design document. In particular, the access rights customization system limits user editing of specific sub-portions to user accounts indicated by one or more mappings while allowing specific user accounts to still view the entire digital design document, which provides accurate editing of a digital design document.

Moreover, the access rights customization system further improves upon computational accuracy by centralizing the digital design document for collaboration. In other words, the access rights customization system generates various mapping between portions of the digital design document and user accounts and sends out a centralized version (e.g., master version) to the user account(s) and receives digital content from the user accounts to modify the various portions. Accordingly, the access rights customization system reduces errors associated with collating/transmitting from multiple separate digital design documents into a single digital design document.

Relatedly, the access rights customization system improves upon operational flexibility. For example, in contrast to existing systems that rigidly limit collaborative document editing to a smaller number of collaborators, the access rights customization system expands digital design collaboration to many user accounts asynchronously editing a digital design document. Accordingly, the access rights customization system tailors the editing access rights for specific user accounts to prevent and expedite the process in which various user accounts can modify a digital design document. In doing so, the access rights customization system more flexibly streamlines the digital design collaboration workflow.

Additional details regarding the access rights customization system will now be provided with reference to the figures. For example, FIG. 1 illustrates a schematic diagram of an exemplary system environment 100 in which an access rights customization system 102 operates. As illustrated in FIG. 1, the system environment 100 includes server(s) 106, a digital document collaboration system 104, a network 108, client devices 114a 114n, and an administrator client device 110. Additionally, FIG. 1 illustrates that the digital document system 104 includes the access rights customization system 102. Additionally, the administrator client device 110 includes an administrator client device 112 and the client devices 114a-114n include client applications 116a-116n.

Although the system environment 100 of FIG. 1 is depicted as having a particular number of components, the system environment 100 is capable of having a different number of additional or alternative components (e.g., a different number of servers, client devices, or other components in communication with the access rights customization system 102 via the network 108). Similarly, although FIG. 1 illustrates a particular arrangement of the server(s) 106, the network 108, the client devices 114a-114n, and the administrator client device 110, various additional arrangements are possible.

The server(s) 106, the network 108, the client devices 114a-114n, and the administrator client device 110 are communicatively coupled with each other either directly or indirectly (e.g., through the network 108 discussed in greater detail below in relation to FIG. 10). Moreover, the server(s) 106, the client devices 114a-114n, and the administrator client device 110 include one or more of a variety of computing devices (including one or more computing devices as discussed in greater detail in relation to FIG. 10).

As mentioned above, the system environment 100 includes the server(s) 106. In one or more embodiments, the server(s) 106 process input to generate one or more mappings for sub-portions of a digital design document and further process input of digital content to modify one or more sub-portions from a user of an administrator client application 112 and/or client applications 116a-116n. In one or more embodiments, the server(s) 106 comprise a data server. In some implementations, the server(s) 106 comprise a communication server or a web-hosting server.

In one or more embodiments, the administrator client device 110 includes a computing device that provides for display the administrator client application 112 (e.g., a digital design application) for editing a digital design document. Additionally, in some embodiments, the administrator client device 110 indicates editing access rights of selected sub-portions of the digital design application to one or more user accounts. Moreover, in some embodiments, the client devices 114a-114n include computing devices associated with the one or more user accounts that view and/or modify sub-portions of digital design documents as indicated by the administrator client device 110. For instance, the access rights customization system 102 assigns different sub-portions of a digital design document to different user accounts of the client devices 114a-114n.

In one or more embodiments, the administrator client device 110 and the client devices 114a-114n include smartphones, tablets, desktop computers, laptop computers, head-mounted-display devices, or other electronic devices. The administrator client device 110 and the client devices 114-114n include one or more software applications (e.g., the administrator client application 112 and/or the client applications 116a-116n include a digital design application) for generating or modifying digital content of a digital design document in accordance with the digital document collaboration system 104. For example, in one or more embodiments, the administrator client application 112 works in tandem with the access rights customization system 102 to assign editing access rights for portions of a digital design document and provide the digital design document to the client devices 114a-114n via the client applications 116a-116n. In additional embodiments, the administrator client application 112 and/or the client applications 116a-116n include a software application hosted on the server(s) 106 accessible by the administrator client device 110 or the client devices 114a-114n through another application, such as a web browser.

To provide an example implementation, in some embodiments, the access rights customization system 102 on the server(s) 106 supports the access rights customization system 102 on the administrator client device 110. For instance, in some cases, the digital document collaboration system 104 on the server(s) 106 gathers data for the access rights customization system 102. In response, the access rights customization system 102, via the server(s) 106, provides the information to the administrator client device 110. In other words, the administrator client device 110 obtains (e.g., downloads) the access rights customization system 102 from the server(s) 106. Once downloaded, the access rights customization system 102 on the administrator client device 110 provides tools for collaborative editing of digital design documents.

In alternative implementations, the access rights customization system 102 includes a web hosting application that allows the administrator client device 110 and the client devices 114a-114n to interact with content and services hosted on the server(s) 106. To illustrate, in one or more implementations, the administrator client device 110 and the client devices 114-114n access a software application supported by the server(s) 106. In response, the access rights customization system 102 on the server(s) 106 provides tools for collaboratively editing a digital design document.

To illustrate, in some cases, the access rights customization system 102 on the administrator client device 110 receives an indication to generate mapping(s) assigning editing access rights for sub-portion(s) of a digital design document to user account(s). The administrator client device 110 transmits the indication to the server(s) 106. In response, the access rights customization system 102 on the server(s) 106 references the mapping(s) to control modifications made by the client devices 114-114n.

Indeed, in some embodiments, the access rights customization system 102 is implemented in whole, or in part, by the individual elements of the system environment 100. For instance, although FIG. 1 illustrates the access rights customization system 102 implemented or hosted on the server(s) 106, different components of the access rights customization system 102 are able to be implemented by a variety of devices within the system environment 100. For example, one or more (or all) components of the access rights customization system 102 are implemented by a different computing device (e.g., the administrator client device 110) or a separate server from the server(s) 106. Indeed, as shown in FIG. 1, the administrator client device 110 includes the access rights customization system 102. Example components of the access rights customization system 102 will be described below with regard to FIG. 8.

Figure 2:
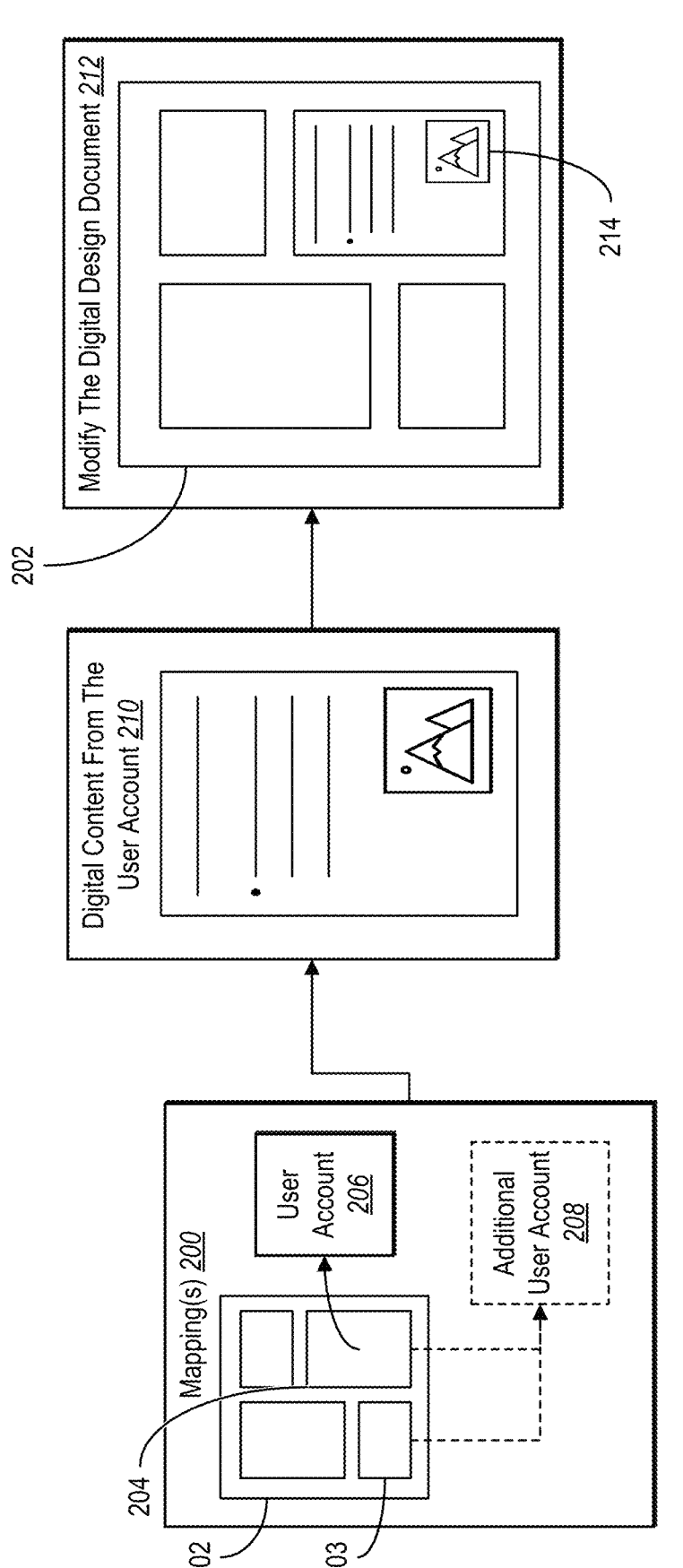
FIG. 2 illustrates an overview of the access rights customization system modifying a digital design document via customized access rights to a document portion in accordance with one or more implementations.

As mentioned above, in certain embodiments, the access rights customization system 102 customizes access editing rights for different sub-portions of a digital design document for different user accounts. FIG. 2 illustrates an overview of the access rights customization system 102 modifying a digital design document by assigning editing access rights for a selected sub-portion of digital design document to a user account. In particular, FIG. 2 illustrates that the access rights customization system 102 generates a mapping for the selected sub-portion and receives digital content from the assigned user account in accordance with one or more embodiments.

For example, FIG. 2 shows a digital design document 202 with a plurality of sub-portions within a digital design application. In one or more embodiments, a digital design application includes a software tool or platform to facilitate creation, modification, and visualization of various types of digital designs including digital content. For example, the digital design application includes various tools and features to create digital designs such as drawing tools, formatting tools, image editing capabilities, text editing tools, and layout design. Moreover, in some embodiments the digital design application includes the capability to open digital design documents and perform various modification operations to the digital design document 202.

In one or more embodiments, the digital design document 202 includes a digital file including one or more types of digital visual content. In particular, the digital design document 202 includes one or more sub-portions (e.g., visually or logically distinct regions) that fit within a dimension of the digital design document 202. For instance, the digital design document 202 includes digital invitations, digital cards, digital fliers, digital posters, blog articles, advertisements, websites, presentations, academic papers, and various other digital files that include design elements such as text, images, or other graphical elements. Accordingly, the digital design application includes tools for a designer/user to edit and modify the digital design document 202 via one or more interactions with a client device.

As shown in FIG. 2, the access rights customization system 102 generates a mapping(s) 200 indicating editing access rights for one or more sub-portions of the digital design document 202. In one or more embodiments, the mapping(s) 200 includes a digital association between an element of the digital design document and a user account. For example, the mapping(s) 200 includes a digital representation of connections or relationships between specific sub-portions and user accounts within a database. For instance, the mapping(s) 200 includes a data structure that contains an indication that a specific sub-portion is associated with one or more user accounts. Further, in some embodiments, the access rights customization system 102 utilizes the mapping(s) 200 to determine which user accounts have permissions to edit specific parts of the digital design document 202.

Further, as shown in FIG. 2, the access rights customization system 102 generates the mapping(s) 200 between a selected sub-portion 204 and a user account 206. In one or more embodiments, the digital design document 202 includes multiple sub-portions. For example, the digital design document 202 includes different sub-portions (e.g., a selected sub-portion 204 and an additional selected sub-portion 203) that define boundaries for placing digital content within the digital design document 202. Further, in some embodiments, a sub-portion has a specific position (e.g., a coordinate position) within the digital design document 202. Moreover, in some embodiments, the position and/or size of the sub-portion depends on a type of digital content corresponding to the sub-portion. In some instances, the sub-portions vary in size within the digital design document 202, while in other instances the sub-portions are all the same size. Moreover, in some instances, the sub-portions have different shapes (e.g., triangles, diamonds, polygons, etc.).

In one or more embodiments, the user account 206 includes a digital identity or profile created for an individual or entity to interact with the digital design document 202 and/or to utilize tools within a digital design application. For instance, the user account 206 has an associated identifier and authorization to perform certain actions such as collaborating to create or modify the digital design document 202. Moreover, in some instances, the access rights customization system 102 associates the user account 206 with a user identifier, profile information (e.g., roles or privileges), an email address, and user activity history. Accordingly, the access rights customization system 102 generates the mapping(s) 200 by generating an association between a specific sub-portion(s) and an email address or user identifier of the user account 206.

As shown in FIG. 2, in some embodiments the access rights customization system 102 further generates the mapping(s) 200 between the additional selected sub-portion 203 and an additional user account 208. In one or more embodiments, the access rights customization system 102 generates a mapping between the selected sub-portion 204 and the additional user account 208. Furthermore, in one or more embodiments, the access rights customization system 102 generates additional mappings between additional sub-portions of the digital design document 202 and the user account 206, the additional user account 208, or another user account.

As shown in FIG. 2, based on the mapping(s) 200, the access rights customization system 102 performs an act 210 of receiving digital content from the user account 206. In one or more embodiment, digital content includes digital text, images, audio, and/or video. For example, the access rights customization system 102 receives the digital content from one or more client devices associated with the user account. Moreover, in some embodiments, the access rights customization system 102 receives the digital content natively within a digital design application on a client computing device (e.g., via direct input into the digital design application) from tools provided within the digital design application. Further, in some embodiments the access rights customization system 102 receives the digital content from one or more different digital applications.

In one or more embodiments, the digital content includes text content. For instance, text content includes written or textual information presented in a digital format. For example, the text content includes letters, words, sentences, and paragraphs that convey meaning and information to the reader. Moreover, in some embodiments, the text content within the digital design application includes user-generated text, article or blog post textual information, email communications, website content, social media posts, e-books, and computer code. Further, in some embodiments, the text content includes various fonts or styles to modify the look and feel of the text.

In one or more embodiments, the digital content includes image content. For instance, the image content includes visual content that conveys information through digital images such as graphics and visual elements, rather than text. For example, the image content includes illustrations, infographics, charts, graphs, logos, memes, and comics. In some embodiments, image content includes digital video content.

As shown in FIG. 2, the access rights customization system 102 performs an act 212 of modifying the digital design document 202. For instance, the access rights customization system 102 receives digital content 214 from the user account 206 and modifies the digital design document 202 to include the digital content 214 in the selected sub-portion 204. Further, in some embodiments the access rights customization system 102 modifies the digital design document 202 by inserting the digital content 214 into the digital design document 202 based on the mapping(s) 200 indicating the selected sub-portion 204.

Figure 3:
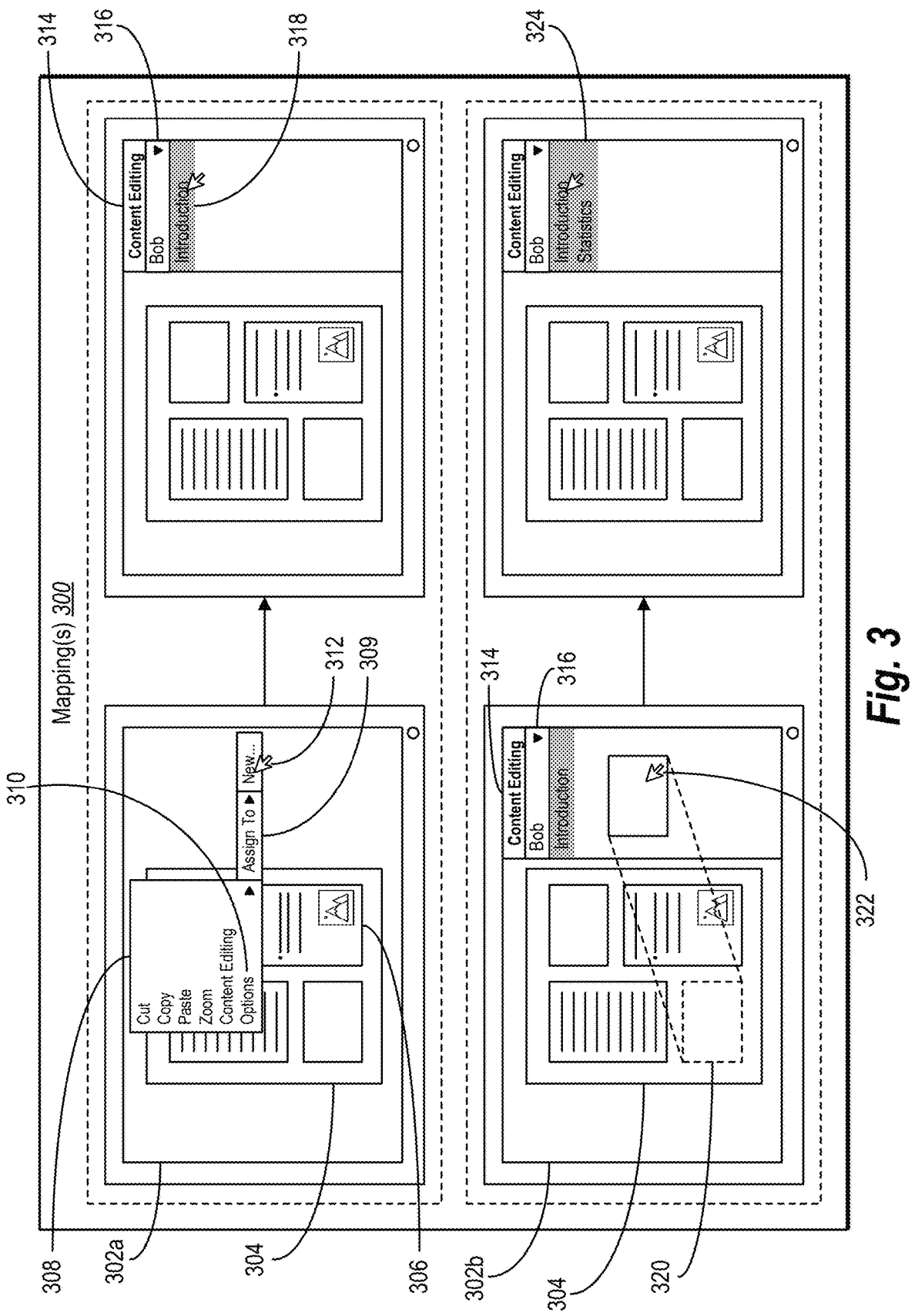
FIG. 3 illustrates a diagram of the access rights customization system generating a mapping a selected sub-portion of a digital design document to a user account in accordance with one or more implementations.

As mentioned above, in certain embodiments, the access rights customization system 102 generates a mapping for a sub-portion of a digital design document based on various indications received from a computing device (e.g., an administrator client device). FIG. 3 illustrates the access rights customization system 102 generating a first mapping and a second mapping in accordance with one or more embodiments. Specifically, FIG. 3 illustrates a plurality of examples of a graphical user interface (e.g., a first graphical user interface 302*a* and a second graphical user interface 302*b*) of a client device displaying a digital design document in a digital design application. For example, FIG. 3, shows a digital design document 304 depicting various sub-portions.

As shown, FIG. 3 illustrates that the access rights customization system 102 generates mapping(s) 300. For example, FIG. 3 shows the access rights customization system 102 generating a mapping via a first process (e.g., as indicated by the dotted box on the top including the first graphical user interface 302*a*). For instance, FIG. 3 shows the access rights customization system 102 receiving an indication of a selected sub-portion 306 of the digital design document 304. Furthermore, in response to the selection of the selected sub-portion 306, the access rights customization system 102 causes the graphical user interface to display a list of elements 308 to perform actions specific to the selected sub-portion 306.

As shown in FIG. 3, the list of elements 308 includes an options element 310. Further, as shown, the options element 310 includes an assignment element 309. For instance, in response to a cursor hovering over or selecting the options element 310, the access rights customization system 102 causes the graphical user interface 302 to display the assignment element 309. Moreover, as shown in FIG. 3, the assignment element 309 includes a new assignment element 312. Likewise, in some embodiments, a cursor hovering over or selecting the assignment element 309 causes the graphical user interface 302 to display the new assignment element 312. Further, in response to the selection of the new assignment element 312, the access rights customization system 102 to generate a mapping that indicates editing access rights for the selected sub-portion 306.

In one or more embodiments, the mapping generated by the access rights customization system 102 indicates editing access rights for the selected sub-portion 306. For example, editing access rights include edit permissions or authorization privileges given to a user account to edit a specific portion of a digital design document. For instance, the editing access rights include the scope and extent to which a user account has permissions to alter and update information within the digital design document. In some instances, the editing access rights prevent unauthorized changes and facilitates collaboration. Further, in some embodiments, the editing access rights specify the specific sub-portion of the digital illustration document that a user account can modify.

Further, as shown in FIG. 3, in response to a selection of the new assignment element 312, the access rights customization system 102 causes the graphical user interface 302 to display a content editing sidebar 314. For instance, the access rights customization system 102 provides the content editing sidebar 314 for entering information corresponding to a user account. In particular, entering information corresponding to a user account in the content editing sidebar 314 causes the access rights customization system 102 to generate a mapping between the selected sub-portion 306 and the entered user account.

As shown in FIG. 3, the content editing sidebar 314 shows a user account 316 corresponding to a user (e.g., "Bob"). For example, the access rights customization system 102 receives input (e.g., a user account identifier bob@example.com) of the user account 316 and identifies a corresponding user (e.g., Bob). For instance, the access rights customization system 102 references a user account database that includes data table/structures for storing information related to user account identifiers and users. Further, in some instances, in response to a user input including part of a user account identifier into the content editing sidebar 314, the access rights customization system 102 searches the user account database to fill in or provide suggestions for selecting the user account 316. To illustrate, in response to a user input entering "b" into the content editing sidebar, the access rights customization system 102 searches the user account database to identify "bob@example.com" and "ben@example.com".

In one or more embodiments, the access rights customization system 102 generates the user account database based on input from an administrator client device. For instance, an administrator client device generates user identifier lists (e.g., emails and corresponding usernames) with category tags (e.g., designer tag, copywriter tag, image editor tag, etc.). As such, after initial configuration of the user account database to include the relevant user identifier lists and category tags, the access rights customization system 102 provides suggestions to designers/administrators when generating the mappings between a selected sub-portion and a user account (e.g., by identifying the type of content intended for the selected sub-portion and referencing the category tag).

Moreover, as shown in FIG. 3, the access rights customization system 102 provides a user selected title 318 in the content editing sidebar 314. In particular, the user selected title 318 represents the selected sub-portion 306 for distinguishing from other sub-portions of the digital design document 304. For example, upon the access rights customization system 102 receiving an indication of the user account 316 for the selected sub-portion 306, the access rights customization system 102 provides an option to input the user selected title 318 (e.g., "introduction").

As further shown in FIG. 3, the access rights customization system 102 generates a mapping via a second process (e.g., as indicated by the dotted box on the bottom including the second graphical user interface 302b). As shown in FIG. 3, the access rights customization system 102 receives an input 322 for a selected sub-portion 320 of the digital design document 304. For instance, the input 322 includes a drag-and-drop action of the selected sub-portion 320 to the content editing sidebar 314. To illustrate, a designer selects the selected sub-portion 320 and drags the selected sub-portion 320 to the content editing sidebar 314. In response, the access rights customization system 102 generates the mapping for the selected sub-portion 320 to the user account 316. Moreover, in response to dragging the selected sub-portion 320 to the content editing sidebar 314, the access rights customization system 102 also provides a user selected title 324 for the selected sub-portion 320 (e.g., "Statistics").

Although FIG. 3 shows the access rights customization system 102 generating the mapping(s) 300 for the user account 316 (e.g., Bob), in one or more embodiments, the content editing sidebar 314 contains mappings for multiple user accounts. For example, the access rights customization system 102 assigns each of the user accounts to one or more of the selected sub-portions in the digital design document 304. Further, in some embodiments, the access right customization system 102 assigns a single selected sub-portion to multiple user accounts.

Moreover, in one or more embodiments, the access rights customization system 102 generates the mapping(s) 300 to enhance asynchronous collaborative editing with multiple different user accounts and different editing access rights. For instance, the access rights customization system 102 generates mappings that indicate full editing access rights for designers (e.g., no limitations on modification rights for the designers) but only text content editing rights for copywriters (e.g., the copywriters cannot edit layout). In doing so, the access rights customization system 102 prevents copywriters from modifying the layout while adding their text content. In other words, the access rights customization system 102 also generates mappings for the type of edits (e.g., text, images, layout, font, style, etc.) performed within the digital design document.

Figure 4:
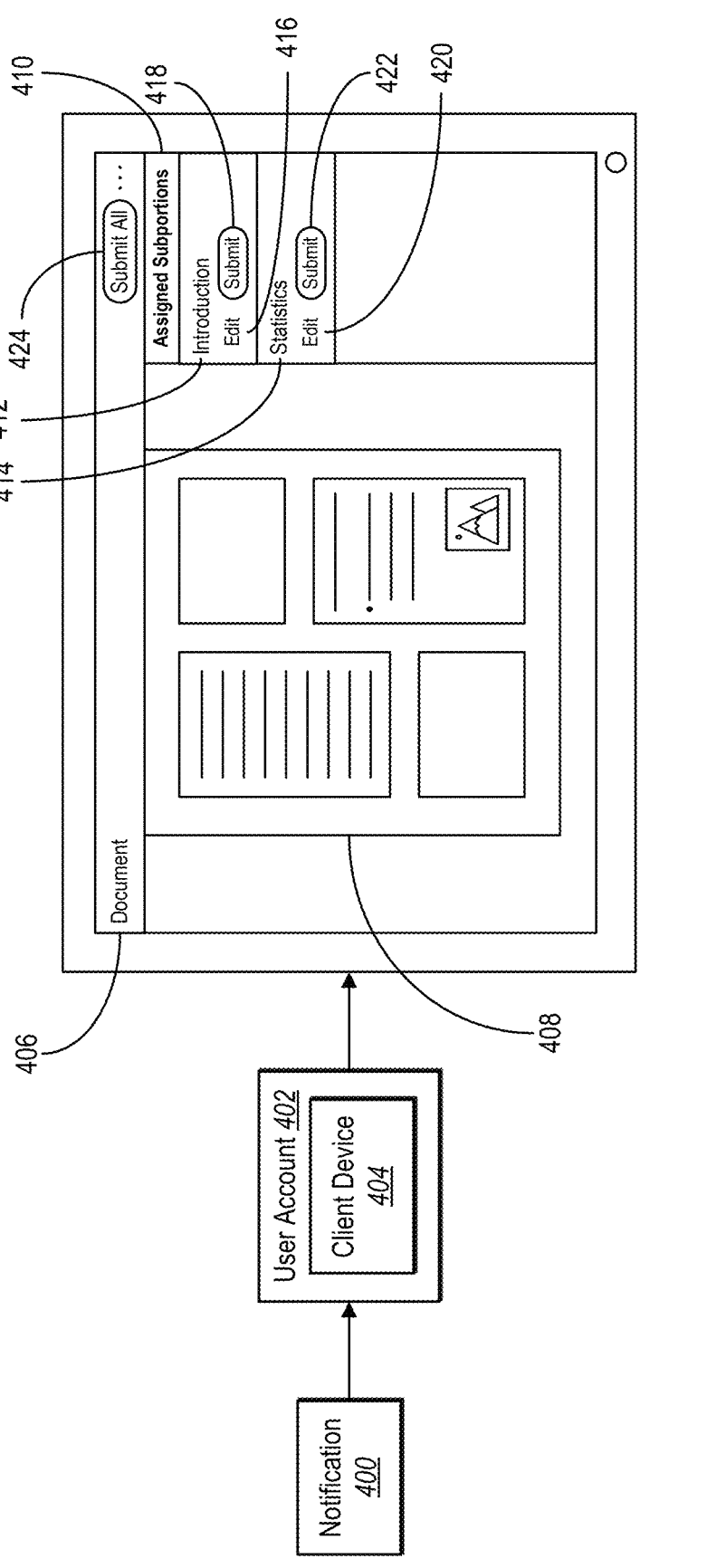
FIG. 4 illustrates a diagram of the access rights customization system sending a notification to a user account regarding editing access rights in accordance with one or more implementations.

As mentioned above, the access rights customization system 102 provides a notification to a user account in response to generating a mapping between a selected sub-portion of a digital design document and the user account. FIG. 4 shows the access rights customization system 102 providing a notification to a user account within a graphical use interface of a digital design document with the assigned mapping in accordance with one or more embodiments.

For example, FIG. 4 shows the access rights customization system 102 sending a notification 400 to a client device 404 associated with a user account 402. In one or more embodiments, the access rights customization system 102 provides the notification 400, which includes a message or alert regarding a specific event, update, or other information. For example, the access rights customization system 102 generates the notification 400 that includes a pop-up window, a sound alert, a vibration to the client device 404, a textual or illustrated message, or a digital banner. For instance, the access rights customization system 102 generates the notification 400 to provide to the user account 402 in response to generating a mapping between a specific sub-portion of the digital design document and the user account 402. Further, as is described in FIG. 6, in some instances the access rights customization system 102 generates a notification to provide to an administrator computing device in response to receiving digital content from the user account for the specified sub-portion.

In one or more embodiments, the client device 404 associated with the user account 402 receives the notification 400, which indicates that the user account 402 has been assigned to modify a digital design document 408. For example, the access rights customization system 102 provides in the notification 400 a link to open the digital design document 408 for display at the client device 404. In one or more embodiments, the link includes a reference or connection to a webpage application or a digital application, which causes the client device 404 to navigate to a different resource in response to a selection of the link. For instance, the access rights customization system 102 provides the link to the user account 402 as a notification and highlights or emphasizes part of the notification to indicate the presence of a link to navigate to the relevant resource (e.g., the webpage application or the digital application).

As shown in FIG. 4, in response to a selection of the notification 400 (e.g., a selection of a link in the notification), the access rights customization system 102 causes a graphical user interface 406 of the client device 404 to display the digital design document 408. For instance, the access rights customization system 102 causes the graphical user interface 406 to display an editing interface. In some embodiments, selecting the link launches a webpage application on the client device 404 to display the digital design document 408. In some embodiments, selecting the link launches a native application of the client device 404.

In one or more embodiments, the editing interface includes a user interface component designed to facilitate modifications, updates, or revisions of digital content within the digital design application. For instance, the editing interface includes tools to make changes to text, images, settings, and other elements. Further, in some embodiments the access rights customization system 102 provides the editing interface that indicates editable elements within the digital design application and locked elements (e.g., not editable) within the digital design application based on the previously generated mapping(s).

As shown in FIG. 4, the access rights customization system 102 provides, for display in the graphical user interface 406, an assigned sub-portions sidebar 410 that indicates the assignments relevant to the user account 402. For example, the assigned sub-portions sidebar 410 shows a first user selected title 412 (e.g., "Introduction") and a second user selected title 414 (e.g., "Statistics"). For each of the user selected titles, the access rights customization system 102 further provides edit elements 416, 420 and submit elements 418, 422.

Moreover, in some embodiments, in response to a selection of an edit elements, the access rights customization system 102 causes the graphical user interface 406 to indicate the selected sub-portion corresponding to the assignment within the digital design document 408. For instance, the access rights customization system 102 highlights or emphasizes the selected sub-portion corresponding to the assigned sub-portion indicated by the mapping within the digital design document 408. In some instances, the selected sub-portion corresponding to the assigned sub-portion does not show within the viewport of the graphical user interface 406. To illustrate, the access rights customization system 102 causes the viewport to display the relevant portion of the digital design document 408 (e.g., by jumping to the relevant portion).

Furthermore, in connection with a selection of an edit element, the client device 404 determines digital content (e.g., text content and/or image content) for modifying the selected sub-portion. In some instances, when the selected sub-portion already contains digital content, the access rights customization system 102 edits the existing digital content with new digital content. Accordingly, the access rights management system 102 provides digital content for a selected sub-portion by adding new digital content or replacing existing digital content with the new digital content.

Furthermore, as shown in FIG. 4, the access rights customization system 102 also provides submit elements 418, 422. For example, the access rights customization system 102 receives a selection of a submit elements indicating that digital content for an assigned sub-portion is complete and ready for insertion into the digital design document 408. For instance, the access rights customization system 102 receives the selection of a submit elements and provides a notification to an administrator client device of the digital content. Moreover, as shown, the access rights customization system 102 also provides a submit all element 424 (e.g., one click submission) in the graphical user interface 406. In some instances, the access rights customization system 102 receives a selection of the submit all element 424 and provides a notification indicating a completion of all assigned sub-portion to an administrator client device.

Moreover, as mentioned above, in one or more embodiments, the access rights customization system 102 locks (e.g., prevents editing) other sub-portions of the digital design document 408 that are not assigned to the user account 402. For instance, as shown in FIG. 4, the access rights customization system 102 indicates that the user account 402 is assigned sub-portions titled "Introduction" and "Statistics." In one or more instances, the access rights customization system 102 prevents other sub-portions from being edited by the user account 402. However, in some instances, the access rights customization system 102 still provides the capability for the user account 402 to view all the elements of the digital design document 408. Accordingly, locking unassigned portions and only allowing editing for assigned portions (e.g., preventing from editing) allows for the user of the client device 404 to effectively add digital content in context with the rest of the digital design document 408.

Figure 5A:
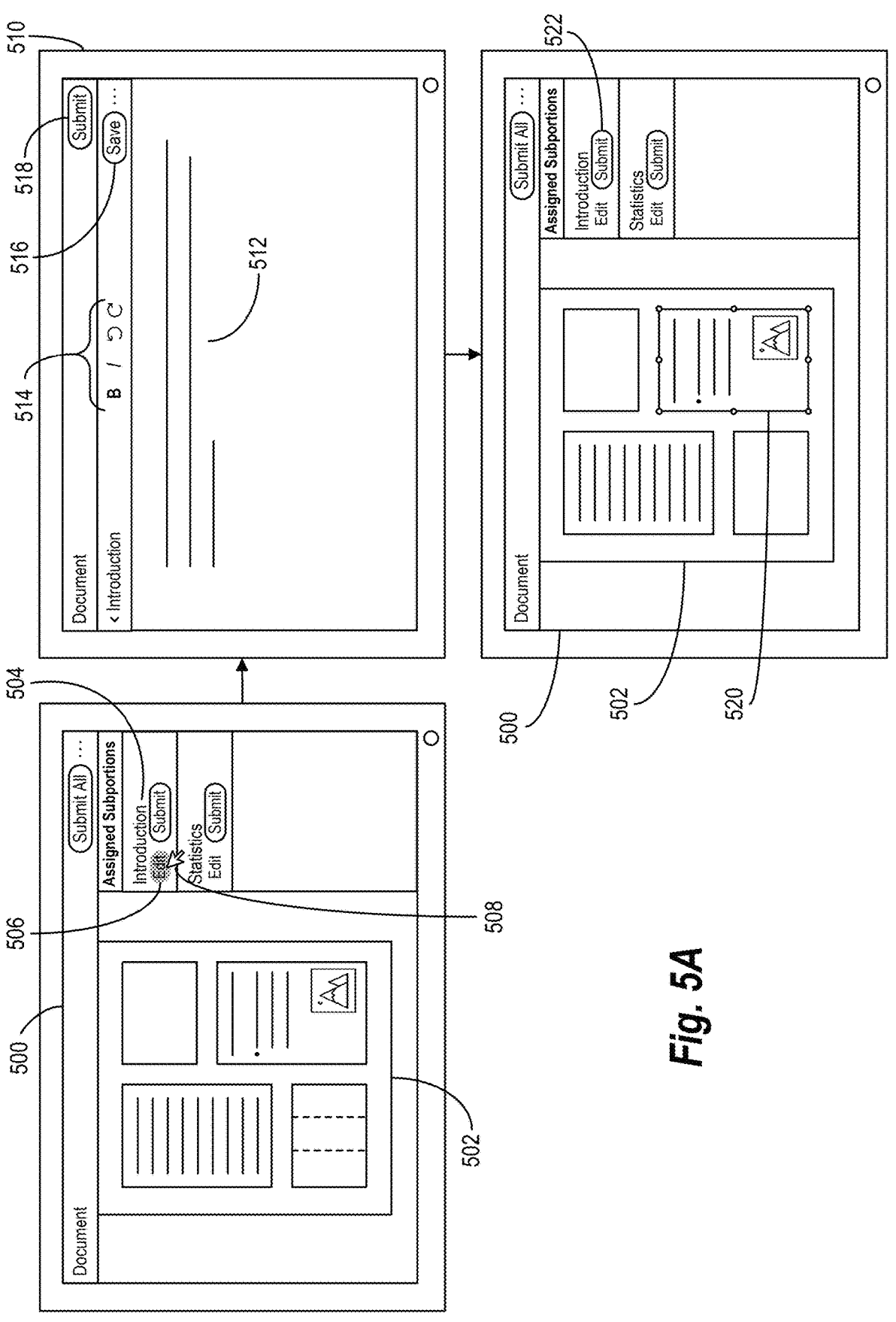
FIGS. 5A-5B illustrates diagrams of the access rights customization system receiving digital content for portions of a digital design document mapped to user accounts in accordance with one or more implementations.

As mentioned above, the access rights customization system 102 provides an editing interface for a user of a user account to edit assigned sub-portions of a digital design document. FIG. 5A illustrates the access rights customization system 102 providing a separate editing interface in accordance with one or more embodiments. For example, as shown in FIG. 5A, the access rights customization system 102 causes a graphical user interface 500 to display a digital design document 502. Further, as also previously discussed, the access rights customization system 102 shows a user selected title 504 of an assigned sub-portion (e.g., "Introduction") with an edit element 506.

As shown in FIG. 5A, the access rights customization system 102 receives a selection 508 of the edit element 506. The access rights customization system 102 further causes the graphical user interface 500 to transition to a separate editing interface 510 in response to the selection 508. In one or more embodiments, the access rights customization system 102 provides the separate editing interface 510 for a user to modify the content of the selected sub-portion (e.g., according to their assigned user editing access via the corresponding user account) within the digital design document 502.

Further, in some embodiments, the access rights customization system 102 provides the separate editing interface 510 for display as an additional window over or alongside the digital design application. In some embodiments, the access rights customization system 102 provides separate editing interface 510 by transitioning from the graphical user interface 500 to the separate editing interface 510 (e.g., within the same or different application). Moreover, in some embodiments the separate editing interface 510 includes a text editor and/or an image editor. Accordingly, in response to a user of a user account selecting an assigned sub-portion of the digital design document 502, the access rights customization system 102 provides the separate editing interface 510 for display in place of the digital design document 502.

As shown in FIG. 5A, the separate editing interface 510 shows a text editing portion 512 to input text to modify an assigned sub-portion of the digital design document 502. To illustrate, the text editing portion 512 includes existing text content in the assigned sub-portion (or no text content if none yet exists). Furthermore, FIG. 5A also shows formatting tools 514 within the separate editing interface 510 to format/change the properties of the text in the text editing portion 512. For instance, the access rights customization system 102 provides the text editing portion 512 and the formatting tools 514 via the separate editing interface 510 for making various modifications in an efficient and easy-to-use manner.

To illustrate, the access rights customization system 102 automatically formats digital content for the assigned sub-portion without requiring a user to click on the assigned sub-portion and determine how to format the digital content to fit within the assigned sub-portion. For instance, the access rights customization system 102 receives digital content via the text editing portion 512 and formats the digital content to fit within the assigned sub-portion in response to the user submitting the digital content.

Furthermore, FIG. 5A shows the separate editing interface 510 displaying a save element 516 and a submit element 518. For example, in response to detecting a selection of the save element 516, the access rights customization system 102 preserves (e.g., without submitting) the current digital content (e.g., in the separate editing interface 510) to correspond with the assigned sub-portion. Further, in some instances, in response to a selection of the submit element 518, the access rights customization system 102 indicates a completion of the assigned sub-portion to an administrator client device.

Moreover, as shown in FIG. 5A, in response to a selection of the save element 516, the access rights customization system 102 causes the separate editing interface 510 to transition to the graphical user interface 500. As illustrated, the graphical user interface 500 also shows the digital design document 502 and an assigned sub-portion 520 that corresponds with the digital content added via the separate editing interface 510. As such, the client device displays how the added digital content fits within the overall layout of the digital design document. In some embodiments, the access rights customization system also provides tools for performing additional iterations to reword or modify the digital content to better fit within the overall layout. Moreover, in the assigned sub-portions sidebar, the access rights customization system 102 provides a submit element 522. In one or more instances, in response to receiving a selection of the submit element 522, the access rights customization system 102 notifies an administrator client device.

Figure 5B:
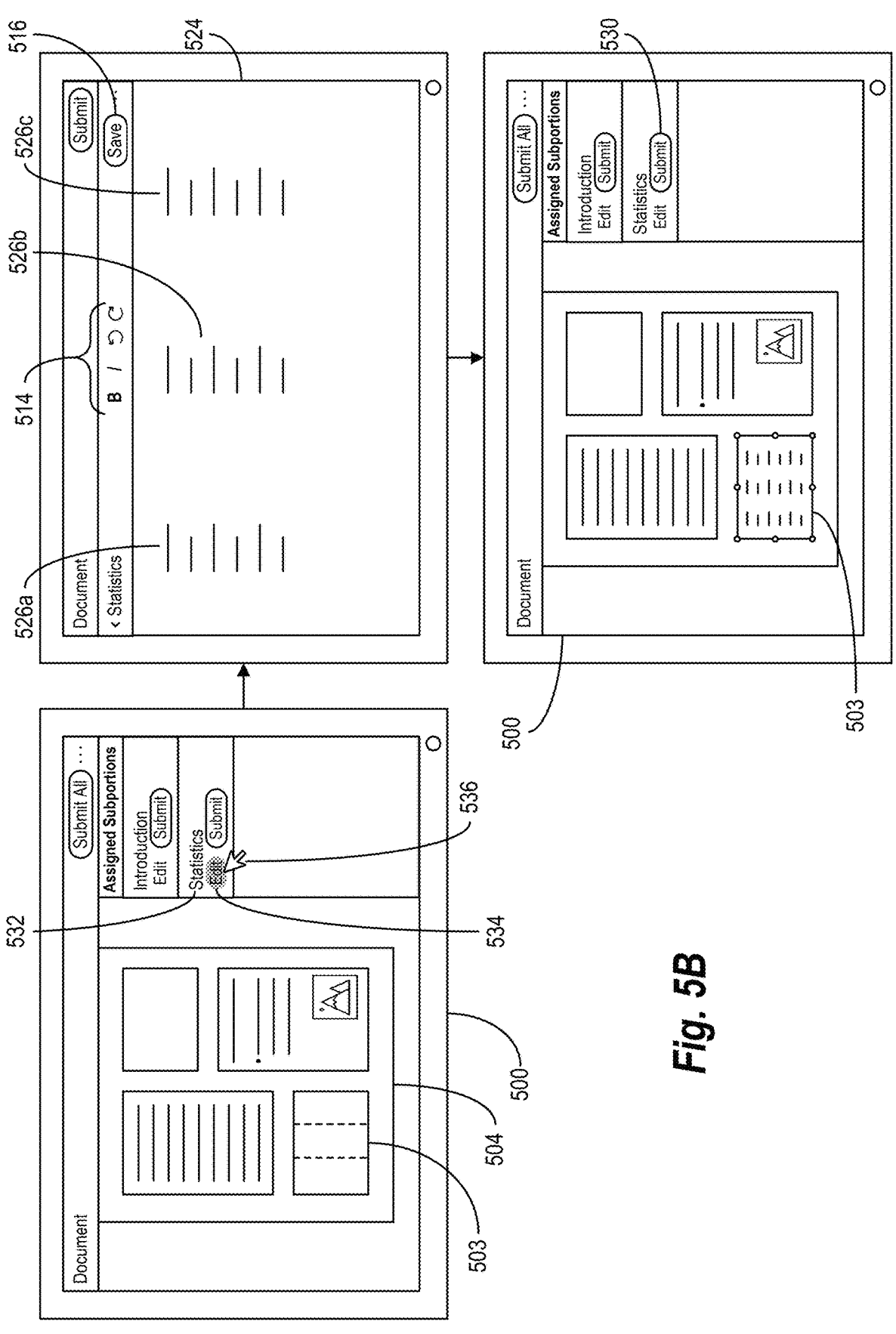

FIG. 5B also illustrates the access rights customization system 102 providing a separate editing interface for an assigned sub-portion divided into different sections. For example, FIG. 5B also shows the graphical user interface 500 with the digital design document 502 of FIG. 5A and a selected sub-portion 503. In addition, FIG. 5B shows a user selected title 532 corresponding to the selected sub-portion 502 (e.g., "Statistics"), an edit element 534, and a selection 536 of the edit element 534.

As shown in FIG. 5B, in response to the selection 536, the access rights customization system 102 causes the graphical user interface 500 to transition to a separate editing interface 524. As shown, the separate editing interface 524 differs from the separate editing interface 510 of FIG. 5A in that the separate editing interface 524 shows different sections for digital content input that correspond with different sections of the selected sub-portion 503. Accordingly, the separate editing interface 524 corresponds with the layout of the selected sub-portion 503 by showing a first input column 526*a*, a second input column 526*b*, and a third input column 526*c* where each column correlates with a corresponding section of the selected sub-portion 503.

Moreover, FIG. 5B shows the save element 516. Similar to above, in response to the access rights customization system 102 receiving a selection of the save element 516, the access rights customization system 102 causes the separate editing interface 524 to transition back to the graphical user interface 500. As shown, in the graphical user interface 500, the selected sub-portion 503 now shows the digital content entered into the separate editing interface 524. Further, FIG. 5B shows a submit element 530 to submit the digital content for the selected sub-portion 503.

Although FIGS. 5A-5B show the access rights customization system 102 providing a separate editing interface to add digital content to the digital design document 502, in one or more embodiments, the access rights customization system 102 allows a user of a client device to directly edit the assigned sub-portion within the digital design document 502. In some embodiments, in response to a selection of the edit element, the access rights customization system 102 provides an option to open a separate editing interface or to directly edit the digital design document 502.

Figure 6:
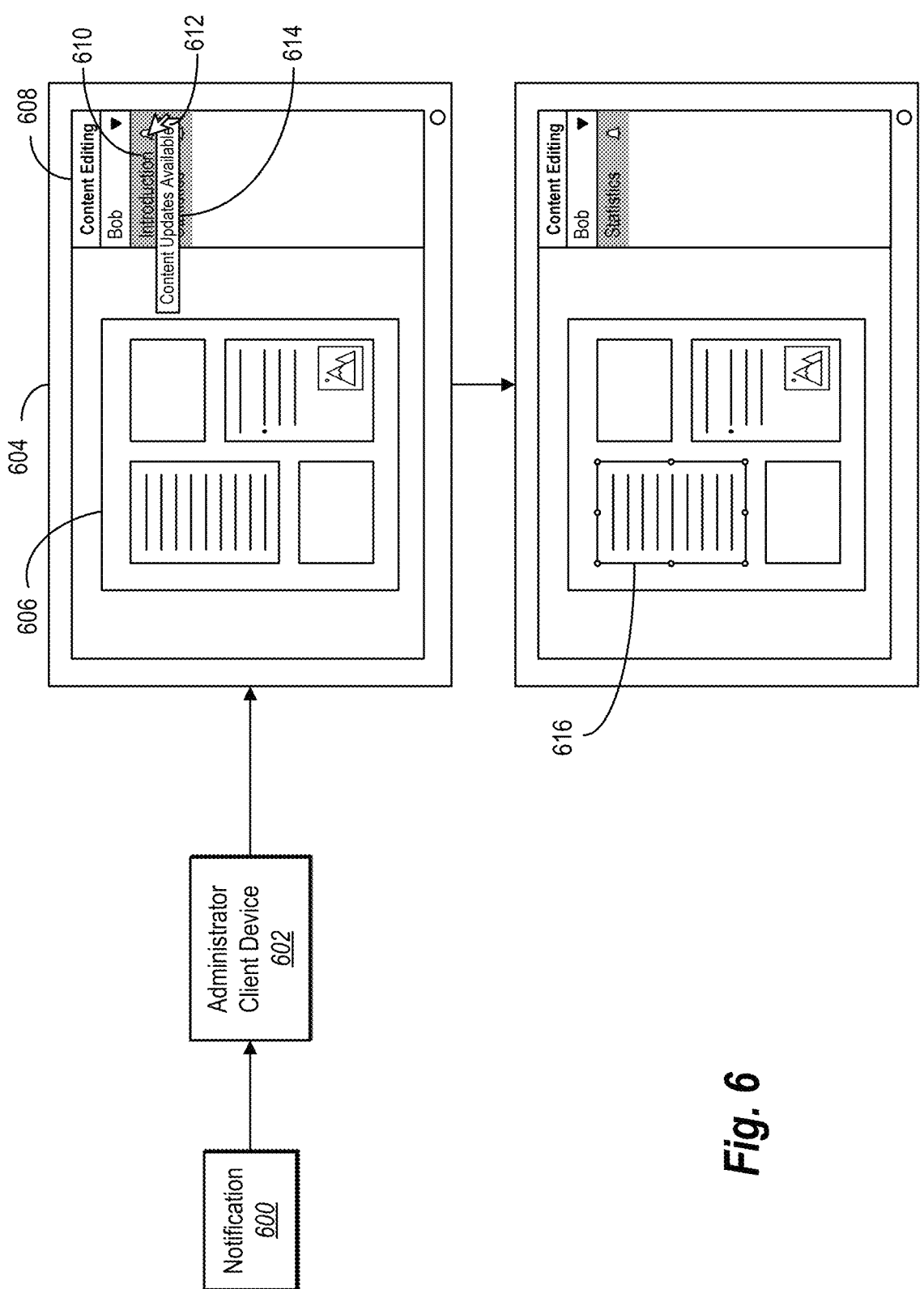
FIG. 6 illustrates a diagram of the access rights customization system sending a notification of modified content for a portion of a digital design document to an administrator client device in accordance with one or more implementations.

As mentioned above, the access rights customization system 102 provides a notification to an administrator client device in response to receiving digital content from a client device. FIG. 6 illustrates the access rights customization system 102 generating a notification to provide to an administrator client device to review the received digital content in accordance with one or more embodiments. For example, as shown in FIG. 6, the access rights customization system 102 generates a notification 600 to provide to an administrator client device 602.

In one or more embodiments, the administrator client device 602 includes a computing device designated for managing and configuring certain permissions. For example, the administrator client device 602 indicates the mapping between specific sub-portions and user accounts. Moreover, in some embodiments, the access rights customization system 102 provides the administrator client device 602 with permissions to accept or reject changes made to the digital design document. Furthermore, in some embodiments, the access rights customization system 102 provides the administrator client device 602 further with permissions to revoke permissions granted to a user account for one or more sub-portions of the digital design document.

As shown in FIG. 6, in connection with providing the notification 600 to the administrator client device 602, the access rights customization system 102 receives a selection of the notification 600. In one or more embodiments, in response to the selection of the notification 600, the access rights customization system 102 causes a graphical user interface 604 of the administrator client device 602 to display a digital design document 606 corresponding to the notification 600. Further, as shown in FIG. 6, the access rights customization system 102 further causes the graphical user interface 604 to display a content editing sidebar 608 with a user selected title 610 of a sub-portion of the digital design document 606 (e.g., "Introduction"). For instance, as shown, in response to a hover action 612 or other selection action of the user selected title 610*s*, the access rights customization system 102 causes the graphical user interface 604 to show an indication 614 of digital content submitted for the sub-portion (e.g., by displaying "content updates available").

As shown in FIG. 6, in response to a selection of the user selected title 610, the access rights customization system 102 shows the digital design document 606 and highlights or emphasizes a sub-portion 616 corresponding to the user selected title 610 based on the content update. Furthermore, in one or more embodiments, in response to the selection of the user selected title 610 or the indication 614, the access rights customization system 102 updates the sub-portion 616 to show the digital content received from the client device.

Although FIG. 6 shows the graphical user interface 604 updated in response to a selection of the user selected title 610, in one or more embodiments, the access rights customization system 102 causes the graphical user interface 604 to immediately show the updates to the digital design document 606 in response to a selection of the notification 600 by the administrator client device 602. Further, in some embodiments, the access rights customization system 102 provides a one click accept element in the graphical user interface 604. In response to receiving a selection of the one click accept element, the access rights customization system 102 modifies the various sub-portions to include the digital content provided by the client devices.

Figure 7:
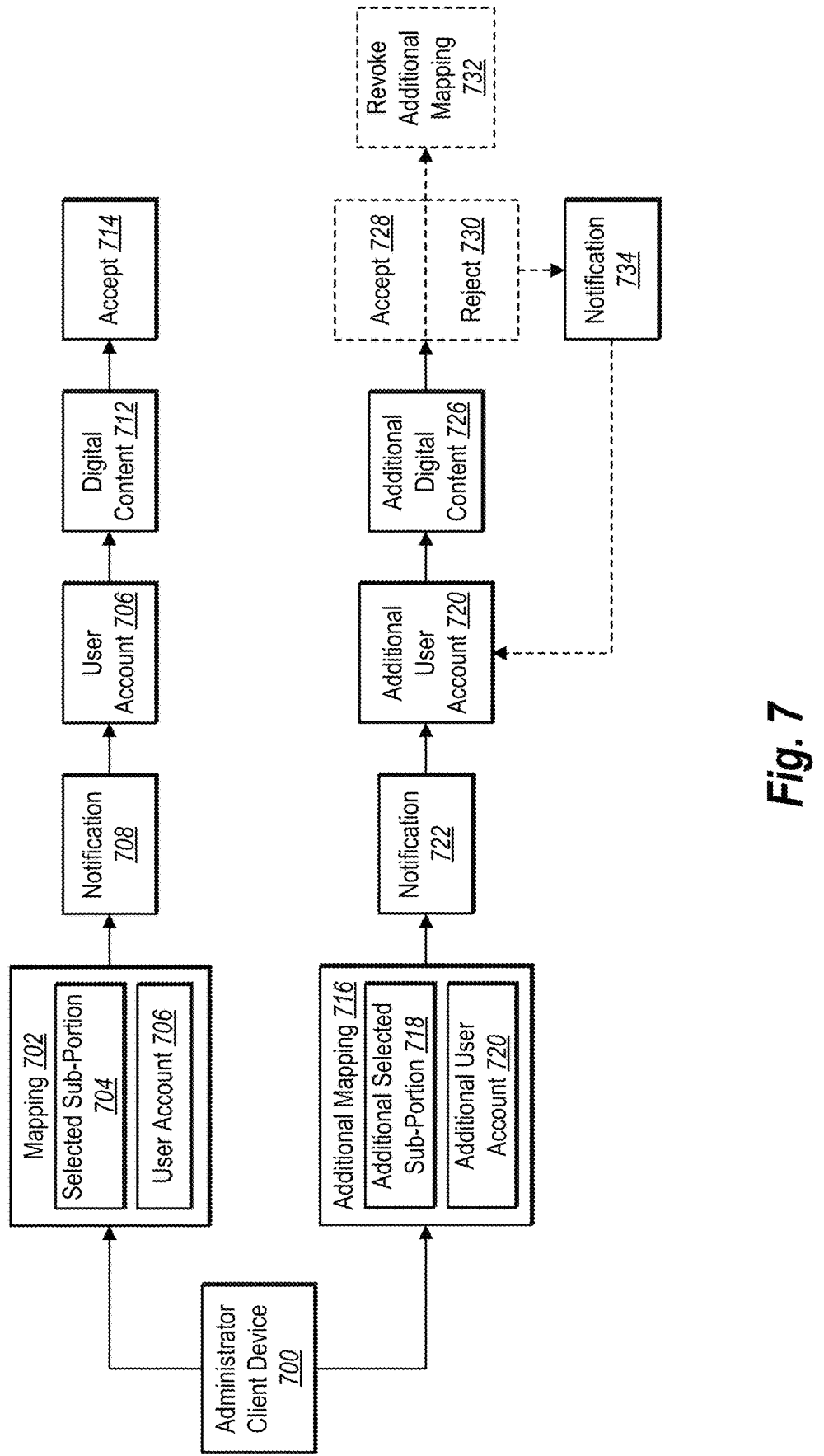
FIG. 7 illustrates a diagram of the access rights customization system accepting or rejecting modifications to a digital design document and modifying editing access rights for a portion of the digital design document in accordance with one or more implementations.

As also mentioned above, in one or more embodiments, the access rights customization system 102 receives one or more modifications to the mapping from an administrator client device. FIG. 7 illustrates the access rights customization system 102 receiving, from an administrator client device, one or more indications related to a mapping or digital content provided by a user account in connection with the mapping in accordance with one or more embodiments.

For example, FIG. 7 shows the access rights customization system 102 receiving, from an administrator client device 700, an indication of a mapping 702 (or a request to generate the mapping 702) that includes a selected sub-portion 704 of a digital design document and a user account 706. Specifically, the mapping 702 indicates editing access rights for the user account 706 for the selected sub-portion 704. Furthermore, in response to the indication of the mapping 702 (or the request to generate the mapping 702), the access rights customization system 102 provides a notification 708 regarding the editing access rights to the user account 706 (e.g., to one or more client devices associated with the user account 706).

As further shown in FIG. 7, the access rights customization system 102 receives digital content 712 from the user account 706 for modifying the selected sub-portion 704. In particular, the user account 706 (e.g., via a corresponding client device) provides the digital content 712 specific for the selected sub-portion 704 to the access rights customization system 102. In response to receiving the digital content 712, the access rights customization system 102 provides a notification to the administrator client device 700 regarding the digital content 712. As shown in FIG. 7, the administrator client device 700 performs an act 714 of accepting the digital content 712 provided from the user account 706 (e.g., via an interaction with the administrator client device 700).

As further shown in FIG. 7, the access rights customization system 102 also receives from the administrator client device 700 an indication of an additional mapping 716 (or a request to generate the additional mapping 716). For example, the additional mapping 716 includes an additional selected sub-portion 718 of the digital design document and an additional user account 720. In response to the indication of the additional mapping 716, the access rights customization system 102 generates a notification 722 regarding the additional mapping 716 and provides the notification 722 to the additional user account 720. Furthermore, the access rights customization system 102 receives additional digital content 726 from the additional user account 720 (e.g., from one or more client devices associated with the additional user account 720).

As shown in FIG. 7, in some embodiments the access rights customization system 102 receives, from the admin-istrator client device 700, an indication to perform an act 728 of accepting the additional digital content 726 for the additional selected sub-portion. For instance, in response to a request by the administrator client device 700 to accept the additional digital content 726 modifying the selected sub-portion, the access rights customization system 102 modifies the additional selected sub-portion 718 to include the addi-tional digital content 726 from the client device of the additional user account 720.

Further, as also shown, in some embodiments the access rights customization system 102 receives, from the admin-istrator client device 700, an indication to perform an act 730 of rejecting the additional digital content 726 for the addi-tional selected sub-portion 718. For instance, in response to a request by the administrator client device 700 to reject the additional digital content 726 modifying the additional selected sub-portion 718, the access rights customization system 102 does not modify the additional selected sub-portion 718. In some instances, the access rights customi-zation system 102 reverts the additional selected sub-portion 718 of the digital design document to previous digital content in the additional selected sub-portion 718.

As further shown, in some instances, the access rights customization system 102 generates a notification 734 in response to accepting or rejecting the additional digital content 726. Further, the access rights customization system 102 provides the notification 734 to the additional user account 720 (e.g., via one or more client devices associated with the additional user account 720). In particular, the notification 734 informs the additional user account 720 regarding either the accepted digital content or the rejected digital content. Furthermore, in some instances the notifi-cation 734 includes notes or feedback from the administrator client device 700.

As also shown, in some embodiments, after accepting or rejecting the additional digital content 726, or otherwise in connection with the additional mapping 716, the access rights customization system 102 further receives an indica-tion from the administrator client device 700 to perform an act 732 of revoking the additional mapping 716. For example, an indication to revoke a mapping includes remov-ing user editing access rights from the additional user account 720 to edit a selected sub-portion (e.g., the addi-tional selected sub-portion 718). Moreover, in some embodi-ments, in response to revoking the additional mapping 716, the access rights customization system 102 sends a notifi-cation to the additional user account 720 indicating the revoked access rights. In one or more embodiments, the access rights customization system 102 provides tools to generate or revoke mappings between one or more sub-portions of a digital design document and one or more user accounts at any time (e.g., independently of the user accounts submitting digital content for modifying the one or more sub-portions).

Figure 8:
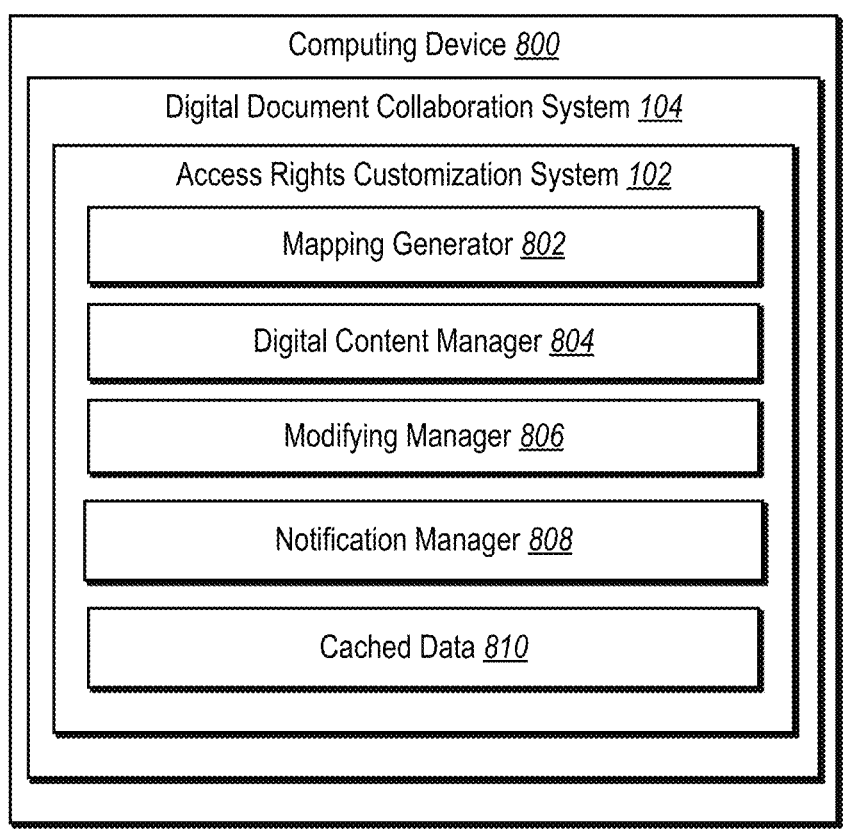
FIG. 8 illustrates a schematic diagram of the access rights customization system in accordance with one or more implementations.

Turning to FIG. 8, additional detail will now be provided regarding various components and capabilities of the access rights customization system 102. In particular, FIG. 8 illus-trates an example schematic diagram of a computing device 800 (e.g., the server(s) 106 and/or the administrator client device 110) implementing the access rights customization system 102 in accordance with one or more embodiments of the present disclosure for components 800-810. As illus-trated in FIG. 8, the access rights customization system 102 includes a mapping generator 802, a digital content manager 804, a modifying manager 806, a notification manager 808, and cached data 810.

The mapping generator 802 generates a mapping that indicates editing access rights for a particular sub-portion of a digital design document. For example, the mapping generator 802 generates a mapping between a selected sub-portion of a digital design document and a user account that indicates editing access rights by the user account for the selected sub-portion. Furthermore, the mapping generator 802 generates the mapping and stores the mapping in a data table or database that indicates a unique identifier with the selected sub-portion and a unique identifier for the user account (e.g., an email address). Moreover, the mapping generator 802 provides one or more mappings to the digital content manager 804 and the notification manager 808.

The digital content manager 804 receives digital content from client devices in connection with one or more sub-portions of a digital design document. For example, the digital content manager 804 receives digital content from a client device associated with a user account for a selected sub-portion. Further, in some embodiments, the digital content manager 804 references a mapping database generated by the mapping generator 802 to determine that the client device is providing digital content for a sub-portion as indicated by the mapping database. Moreover, in some embodiments, the digital content manager 804 passes the digital content to the notification manager 808.

The modifying manager 806 modifies a selected sub-portion to include digital content. For example, the modifying manager 806 receives an indication of the digital content provided by the client device conforming with a mapping in the mapping database. For instance, the modifying manager 806 receives confirmation of the mapping for the digital content and modifies the selected sub-portion to include the digital content. Moreover, in some embodiments, the modifying manager 806 further interacts with the notification manager 808 to inform the notification manager 808 regarding the modification.

The notification manager 808 generates a notification to provide to one or more computing devices. For example, the notification manager 808 sends a notification to a client device associated with a user account in response to the mapping generator 802 generating a mapping between a selected sub-portion and the user account. Furthermore, the notification manager 808 also sends a notification to an administrator client device in response to a client device of a user account providing digital content for a selected sub-portion. Moreover, the notification manager 808 provides a notification to the client device in response to the administrator client device accepting or rejecting the digital content and/or in connection with revoking or changing permissions for the user account (e.g., modifying the mapping(s)).

The cached data 810 stores the mapping(s), the digital content, the digital design documents and other data obtained from the administrator client device and/or the client device(s). For example, the cached data 810 caches/stores the generated mapping(s) for a plurality of sub-portions, the digital design documents (e.g., owned and managed by which administrator client devices), and various notification sent to computing devices. Accordingly, the access rights customization system 102 references the cached data 810 in performing various acts related to generating the mapping and modifying selected sub-portions with digital content.

Each of the components 802-810 of the access rights customization system 102 can include software, hardware, or both. For example, the components 802-810 can include one or more instructions stored on a computer-readable storage medium and executable by processors of one or more computing devices, such as a client device or server device. When executed by the one or more processors, the computer-executable instructions of the access rights customization system 102 can cause the computing device(s) to perform the methods described herein. Alternatively, the components 802-810 can include hardware, such as a special-purpose processing device to perform a certain function or group of functions. Alternatively, the components 802-810 of the access rights customization system 102 can include a combination of computer-executable instructions and hardware.

Furthermore, the components 802-810 of the access rights customization system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 802-810 of the access rights customization system 102 may be implemented as a stand-alone application, such as a desktop or mobile application. Furthermore, the components 802-810 of the access rights customization system 102 may be implemented as one or more web-based applications hosted on a remote server. Alternatively, or additionally, the components 802-810 of the access rights customization system 102 may be implemented in a suite of mobile device applications or "apps." For example, in one or more embodiments, the access rights customization system 102 can comprise or operate in connection with digital software applications such as ADOBE® CREATIVE CLOUD®, ADOBE® PHOTOSHOP®, ADOBE® ILLUSTRATOR®, and/or ADOBE® INDESIGN®.

FIGS. 1-8, the corresponding text, and the examples provide a number of different methods, systems, devices, and non-transitory computer-readable media of the 802-810. In addition to the foregoing, one or more embodiments can also be described in terms of flowcharts comprising acts for accomplishing the particular result, as shown in FIG. 9. FIG. 9 may be performed with more or fewer acts. Further, the acts may be performed in different orders. Additionally, the acts described herein may be repeated or performed in parallel with one another or in parallel with different instances of the same or similar acts.

FIG. 9 illustrates a flowchart of a series of acts 900 for modifying a selected sub-portion of a digital design document to include digital content via customized editing access rights in accordance with one or more embodiments. FIG. 9 illustrates acts according to one embodiment, alternative embodiments may omit, add to, reorder, and/or modify any of the acts shown in FIG. 9. In some implementations, the acts of FIG. 9 are performed as part of a method. For example, in some embodiments, the acts of FIG. 9 are performed as part of a computer-implemented method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one memory device. The system further includes at least one server device configured to cause the system to perform the acts of FIG. 9.

The series of acts 900 includes an act 902 of generating a mapping between a selected sub-portion of a plurality of sub-portions of a digital design document and a user account. Further, the series of acts 900 includes a sub-act 904 of generating a notification regarding the mapping between the selected sub-portion and the user account. Further, the series of acts 900 includes an act 906 of receiving digital content from a client device associated with the user account. Moreover, the series of acts 900 includes a sub-act 908 of generating a notification regarding the digital content. Additionally, the series of acts 900 includes an act 910 of modifying the selected sub-portion to include the digital content from the client device.

In particular, the act 902 includes generating, by at least one processor, a mapping between a selected sub-portion of a plurality of sub-portions of a digital design document and a user account indicating editing access rights to the selected sub-portion for the user account. Further, the act 906 includes receiving, by the at least one processor, digital content from a client device associated with the user account for the selected sub-portion. Moreover, the act 910 includes modifying, by the at least one processor, the selected sub-portion to include the digital content from the client device based on the mapping between the selected sub-portion and the user account.

For example, in one or more embodiments, the series of acts 900 includes generating an additional mapping between an additional selected sub-portion of the plurality of sub-portions of the digital design document and an additional user account. In addition, in one or more embodiments, the series of acts 900 includes generating an additional mapping between an additional selected sub-portion and the user account indicating editing access rights to the additional selected sub-portion for the user account. Further, in one or more embodiments, the series of acts 900 receiving digital content that includes at least one of text content or image content for the selected sub-portion.

Moreover, in one or more embodiments, the series of acts 900 includes providing a separate editing interface to the client device for entering the digital content for the selected sub-portion. Further, in one or more embodiments, sub-act 904 includes in response to generating the mapping, generating a notification regarding the mapping between the selected sub-portion and the user account. Moreover, in one or more embodiments, the series of acts 900 includes providing the notification to the client device associated with the user account. Further, in one or more embodiments, the series of acts 900 includes receiving an indication of a selection of the notification from the client device. Moreover, in one or more embodiments, the series of acts 900 includes providing, in a graphical user interface of the client device in response to the indication, an editing interface for the selected sub-portion.

Additionally, in one or more embodiments, the series of acts 900 includes preventing the client device from adding additional digital content to the plurality of sub-portions other than the selected sub-portion. Moreover, in one or more embodiments, sub-act 908 includes in response to receiving the digital content from the client device, generating a notification indicating the digital content. Further, in one or more embodiments, the series of acts 900 includes providing the notification indicating the digital content for display at an administrator client device.

Furthermore, in one or more embodiments, the series of acts 900 includes receiving an indication from the administrator client device to accept modifying the selected sub-portion to include the digital content for the selected sub-portion. Moreover, in one or more embodiments, the series of acts 900 includes modifying the selected sub-portion in response to the indication to accept modifying the selected sub-portion.

Moreover, in one or more embodiments, the series of acts 900 includes generating a mapping between a selected sub-portion of a plurality of sub-portions of the digital design document and a user account indicating editing access rights to the selected sub-portion for the user account. Further, in one or more embodiments, the series of acts 900 includes in response to generating the mapping between the selected sub-portion of the plurality of sub-portions of the digital design document and the user account, generating, for display at a client device associated with the user account, a notification regarding the mapping between the selected sub-portion and the user account. Moreover, in one or more embodiments, the series of acts 900 includes receiving digital content from the client device associated with the user account for the selected sub-portion. Further, in one or more embodiments, the series of acts 900 includes modifying the selected sub-portion to include the digital content from the client device based on the mapping between the selected sub-portion and the user account.

In addition, in one or more embodiments, the series of acts 900 includes generating the mapping between the selected sub-portion of the plurality of sub-portions of the digital design document and the user account in response to a first indication of an association between the selected sub-portion and the user account. Further, in one or more embodiments, the series of acts 900 includes generate an additional mapping between an additional selected sub-portion and an additional user account in response to a second indication of an association between the additional selected sub-portion and the additional user account. Moreover, in one or more embodiments, the series of acts 900 includes providing the notification to the client device associated with the user account with a link to open the digital design document with the plurality of sub-portions.

Further, in one or more embodiments, the series of acts 900 includes receive an indication of a selection of the link to open the digital design document. Moreover, in one or more embodiments, the series of acts 900 includes causing a graphical user interface of the client device associated with the user account to display the digital design document with an element indicating the selected sub-portion for the user account. Further, in one or more embodiments, the series of acts 900 includes in response to receiving additional digital content from the client device for the selected sub-portion, providing an additional notification indicating the digital content to an administrator client device. Moreover, in one or more embodiments, the series of acts 900 includes receiving an indication from the administrator client device to reject modifying the selected sub-portion to include the additional digital content for the selected sub-portion.

Moreover, in one or more embodiments, the series of acts 900 includes generating a first mapping between a first selected sub-portion of a plurality of sub-portions of a digital design document and a first user account, the first mapping indicating editing access rights to the first selected sub-portion for the first user account. Further, in one or more embodiments, the series of acts 900 includes generating a second mapping between a second selected sub-portion of the plurality of sub-portions and a second user account, the second mapping indicating editing access rights to the second selected sub-portion for the second user account. Moreover, in one or more embodiments, the series of acts 900 includes receiving a first set of digital content from a first client device associated with the first user account for the first selected sub-portion and a second set of digital content from a second client device associated with the second user account for the second selected sub-portion.

Further, in one or more embodiments, the series of acts 900 includes modifying the first selected sub-portion to include the first set of digital content and the second selected sub-portion to include the second set of digital content based on the first mapping and the second mapping.

In addition, in one or more embodiments, the series of acts 900 includes generating the first mapping further comprises receiving a first indication from an administrator client device of the first mapping between the first selected sub-portion of the plurality of sub-portions and the first user account. Further, in one or more embodiments, the series of acts 900 includes generating the second mapping further comprises receiving a second indication from the administrator client device of the second mapping between the second selected sub-portion of the plurality of sub-portions and the second user account.

Moreover, in one or more embodiments, the series of acts 900 includes causing a graphical user interface of the first client device associated with the first user account to display the digital design document with an element indicating the first selected sub-portion for the first user account. Further, in one or more embodiments, the series of acts 900 includes in response to a selection of the first selected sub-portion by the first client device, providing an option to cause the graphical user interface to display a separate editing interface to the first client device for entering the first set of digital content for the first selected sub-portion.

Further, in one or more embodiments, the series of acts 900 includes in response to receiving the first set of digital content from the first client device, providing a first notification indicating the first set of digital content to an administrator client device. Moreover, in one or more embodiments, the series of acts 900 includes in response to receiving the second set of digital content from the second client device, providing a second notification indicating the second set of digital content to the administrator client device. Further, in one or more embodiments, the series of acts 900 includes receiving an indication from an administrator client device to revoke the first mapping between the first selected sub-portion and the first user account. Moreover, in one or more embodiments, the series of acts 900 includes in response to receiving the indication from the administrator client device removing the first mapping between the first selected sub-portion and the first user account and modifying the editing access rights to the first selected sub-portion for the first user account to prevent access to the first selected sub-portion by the first user account.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
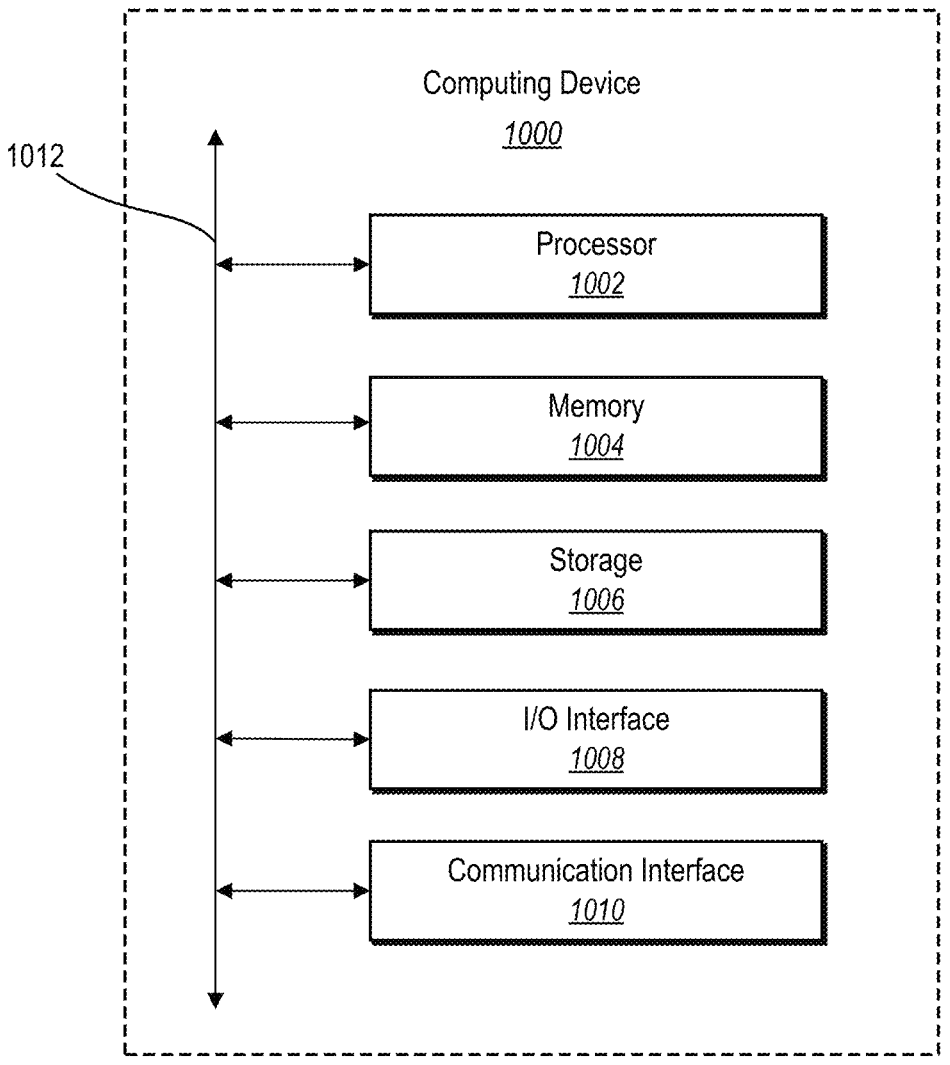
FIG. 10 illustrates a block diagram of an exemplary computing device in accordance with one or more implementations.

FIG. 10 illustrates a block diagram of an example computing device 1000 that may be configured to perform one or more of the processes described above. One will appreciate that one or more computing devices, such as the computing device 1000 may represent the computing devices described above (e.g., the server(s) 106 and/or the client device 110). In one or more embodiments, the computing device 1000 may be a mobile device (e.g., a mobile telephone, a smartphone, a PDA, a tablet, a laptop, a camera, a tracker, a watch, a wearable device). In some embodiments, the computing device 1000 may be a non-mobile device (e.g., a desktop computer or another type of client device). Further, the computing device 1000 may be a server device that includes cloud-based processing and storage capabilities.

As shown in FIG. 10, the computing device 1000 can include one or more processor(s) 1002, memory 1004, a storage device 1006, input/output interfaces 1008 (or "I/O interfaces 1008"), and a communication interface 1010, which may be communicatively coupled by way of a communication infrastructure (e.g., bus 1012). While the computing device 1000 is shown in FIG. 10, the components illustrated in FIG. 10 are not intended to be limiting. Additional or alternative components may be used in other embodiments. Furthermore, in certain embodiments, the computing device 1000 includes fewer components than those shown in FIG. 10. Components of the computing device 1000 shown in FIG. 10 will now be described in additional detail.

In particular embodiments, the processor(s) 1002 includes hardware for executing instructions, such as those making up a computer program. As an example, and not by way of limitation, to execute instructions, the processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1004 may be internal or distributed memory.

The computing device 1000 includes a storage device 1006 including storage for storing data or instructions. As an example, and not by way of limitation, the storage device 1006 can include a non-transitory storage medium described above. The storage device 1006 may include a hard disk drive (HDD), flash memory, a Universal Serial Bus (USB) drive or a combination these or other storage devices.

As shown, the computing device 1000 includes one or more I/O interfaces 1008, which are provided to allow a user to provide input to (such as user strokes), receive output from, and otherwise transfer data to and from the computing device 1000. These I/O interfaces 1008 may include a mouse, keypad or a keyboard, a touch screen, camera, optical scanner, network interface, modem, other known I/O devices or a combination of such I/O interfaces 1008. The touch screen may be activated with a stylus or a finger.

The I/O interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1008 are configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 provides one or more interfaces for communication (such as, for example, packet-based communication) between the computing device and one or more other computing devices or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can include hardware, software, or both that connects components of computing device 1000 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed:

1. A computer-implemented method comprising:

receiving, by at least one processor, a drag-and-drop action of a selected sub-portion of a plurality of sub-portions of a digital design document to a content editing sidebar in a graphical user interface displaying the digital design document;

generating, by the at least one processor, a mapping between the selected sub-portion of the plurality of sub-portions of the digital design document and a user account based on the drag-and-drop action of the selected sub-portion, wherein the mapping indicates editing access rights to the selected sub-portion for the user account;

receiving, by the at least one processor, digital content from a client device associated with the user account for the selected sub-portion; and modifying, by the at least one processor, the selected sub-portion to include the digital content from the client device based on the mapping between the selected sub-portion and the user account.

2. The computer-implemented method of claim 1, further comprising generating an additional mapping between an additional selected sub-portion of the plurality of sub-portions of the digital design document and an additional user account.

3. The computer-implemented method of claim 1, further comprising generating an additional mapping between an additional selected sub-portion and the user account indicating editing access rights to the additional selected sub-portion for the user account.

4. The computer-implemented method of claim 1, wherein receiving the digital content from the client device further comprises receiving digital content that includes at least one of text content or image content for the selected sub-portion.

5. The computer-implemented method of claim 1, further comprising providing a separate editing interface to the client device for entering the digital content for the selected sub-portion.

6. The computer-implemented method of claim 1, further comprising:

in response to generating the mapping, generating a notification regarding the mapping between the selected sub-portion and the user account; and providing the notification to the client device associated with the user account.

7. The computer-implemented method of claim 6, further comprising:

receiving an indication of a selection of the notification from the client device; and providing, in a graphical user interface of the client device in response to the indication, an editing interface for the selected sub-portion.

8. The computer-implemented method of claim 1, further comprising preventing the client device from adding additional digital content to the plurality of sub-portions other than the selected sub-portion.

9. The computer-implemented method of claim 1, further comprising:

in response to receiving the digital content from the client device, generating a notification indicating the digital content; and providing the notification indicating the digital content for display at an administrator client device.

10. The computer-implemented method of claim 9, wherein modifying the selected sub-portion comprises:

receiving an indication from the administrator client device to accept modifying the selected sub-portion to include the digital content for the selected sub-portion; and modifying the selected sub-portion in response to the indication to accept modifying the selected sub-portion.

11. A system comprising:

one or more memory devices comprising a digital design document; and one or more processors configured to cause the system to:

generate a mapping between a selected sub-portion of a plurality of sub-portions of the digital design document and a user account indicating editing access rights to the selected sub-portion for the user account;

in response to generating the mapping between the selected sub-portion of the plurality of sub-portions of the digital design document and the user account, generate, for display at a client device associated with the user account, a selectable notification element regarding the mapping between the selected sub-portion and the user account, cause, in response to a selection of the selectable notification element, the client device to visually emphasize the selected sub-portion according to the mapping between the selected sub-portion and the user account;

receive digital content from the client device associated with the user account for the selected sub-portion; and modify the selected sub-portion to include the digital content from the client device based on the mapping between the selected sub-portion and the user account.

12. The system of claim 11, wherein the one or more processors are configured to cause the system to:

generate the mapping between the selected sub-portion of the plurality of sub-portions of the digital design document and the user account in response to a first indication of an association between the selected sub-portion and the user account; and generate an additional mapping between an additional selected sub-portion and an additional user account in response to a second indication of an association between the additional selected sub-portion and the additional user account.

13. The system of claim 11, wherein the one or more processors are configured to cause the system to provide the selectable notification element to the client device associated with the user account, wherein the selectable notification element comprises a link to open the digital design document with the plurality of sub-portions.

14. The system of claim 13, wherein the one or more processors are configured to cause the system to:

receive an indication of a selection of the link to open the digital design document;

cause, in response to the selection of the link, a graphical user interface of the client device associated with the user account to display a page of the digital design document; and cause, the graphical user interface of the client device to visually scroll to an element on an additional page of the digital design document, wherein the element indicates the selected sub-portion for the user account.

15. The system of claim 11, wherein the one or more processors are configured to cause the system to:

in response to receiving additional digital content from the client device for the selected sub-portion, provide an additional notification indicating the digital content to an administrator client device; and receive an indication from the administrator client device to reject modifying the selected sub-portion to include the additional digital content for the selected sub-portion.

16. A non-transitory computer-readable medium storing executable instructions which, when executed by at least one processing device, cause the at least one processing device to perform operations comprising:

receiving a first drag-and-drop action of a first selected sub-portion and a second drag-and-drop action of a second selected sub-portion of a plurality of sub-portions of a digital design document to a content editing sidebar in a graphical user interface displaying the digital design document;

generating a first mapping between the first selected sub-portion of the plurality of sub-portions of the digital design document and a first user account based on the first drag-and-drop action, the first mapping indicating editing access rights to the first selected sub-portion for the first user account;

generating a second mapping between the second selected sub-portion of the plurality of sub-portions and a second user account based on the second drag-and-drop action, the second mapping indicating editing access rights to the second selected sub-portion for the second user account;

receiving a first set of digital content from a first client device associated with the first user account for the first selected sub-portion and a second set of digital content from a second client device associated with the second user account for the second selected sub-portion; and modifying the first selected sub-portion to include the first set of digital content and the second selected sub-portion to include the second set of digital content based on the first mapping and the second mapping.

17. The non-transitory computer-readable medium of claim 16, wherein:

generating the first mapping further comprises receiving a first selection from an administrator client device of the first user account, wherein the first selection is selected from a user account list that corresponds to a user account database that stores information related to user account identifiers; and generating the second mapping further comprises receiving a second selection from the administrator client device of the second user account.

18. The non-transitory computer-readable medium of claim 16, wherein the operations further comprise:

causing a graphical user interface of the first client device associated with the first user account to display the digital design document with an element indicating the first selected sub-portion for the first user account; and in response to a selection of the first selected sub-portion by the first client device, providing an option to cause the graphical user interface to display a separate editing interface to the first client device for entering the first set of digital content for the first selected sub-portion.

19. The non-transitory computer-readable medium of claim 16, wherein the operations further comprise:

in response to receiving the first set of digital content from the first client device, providing a first notification indicating the first set of digital content to an administrator client device; and in response to receiving the second set of digital content from the second client device, providing a second notification indicating the second set of digital content to the administrator client device.

20. The non-transitory computer-readable medium of claim 16, wherein the operations further comprise:

receiving an indication from an administrator client device to revoke the first mapping between the first selected sub-portion and the first user account; and in response to receiving the indication from the administrator client device:

removing the first mapping between the first selected sub-portion and the first user account; and modifying the editing access rights to the first selected sub-portion for the first user account to prevent access to the first selected sub-portion by the first user account.

* * * * *